(12) United States Patent
Sjostrom et al.

(10) Patent No.: US 11,065,578 B2
(45) Date of Patent: *Jul. 20, 2021

(54) CONTROL OF WET SCRUBBER OXIDATION INHIBITOR AND BYPRODUCT RECOVERY

(71) Applicant: ADA-ES, Inc., Highlands Ranch, CO (US)

(72) Inventors: Sharon Sjostrom, Sedalia, CO (US); Kenneth E. Baldrey, Denver, CO (US); Constance Senior, Littleton, CO (US)

(73) Assignee: ADA-ES, Inc., Highlands Ranch, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/834,685

(22) Filed: Mar. 30, 2020

(65) Prior Publication Data
US 2020/0230550 A1    Jul. 23, 2020

Related U.S. Application Data

(63) Continuation of application No. 16/188,758, filed on Nov. 13, 2018, now Pat. No. 10,758,863, which is a (Continued)

(51) Int. Cl.
*B01D 53/68* (2006.01)
*B01D 53/64* (2006.01)
(Continued)

(52) U.S. Cl.
CPC ............ *B01D 53/68* (2013.01); *B01D 15/08* (2013.01); *B01D 53/346* (2013.01); *B01D 53/40* (2013.01);
(Continued)

(58) Field of Classification Search
CPC ........... B01D 53/1456; B01D 53/1481; B01D 53/40; B01D 53/50; B01D 53/501;
(Continued)

(56) References Cited

U.S. PATENT DOCUMENTS 208,011 A   9/1878   Eaton
224,649 A   2/1880   Child
(Continued)

FOREIGN PATENT DOCUMENTS

CA   1067835   12/1979
CA   1099490   4/1981
(Continued)

OTHER PUBLICATIONS

U.S. Appl. No. 13/861,162, filed Apr. 11, 2013.
(Continued)

*Primary Examiner* — Timothy C Vanoy
(74) *Attorney, Agent, or Firm* — Sheridan Ross P.C.

(57) ABSTRACT

The present disclose is directed to a method for controlling iodine levels in wet scrubbers, and, in particular, recirculating wet scrubbers by removing the iodine from the scrubbing solution, such as by using ion exchange, absorption, adsorption, precipitation, filtration, solvent extraction, ion pair extraction, and an aqueous two-phase extraction.

20 Claims, 6 Drawing Sheets

Related U.S. Application Data continuation of application No. 15/694,536, filed on Sep. 1, 2017, now Pat. No. 10,159,931, which is a continuation of application No. 15/217,749, filed on Jul. 22, 2016, now Pat. No. 9,889,405, which is a continuation of application No. 14/512,142, filed on Oct. 10, 2014, now Pat. No. 9,409,123, which is a continuation of application No. 13/861,162, filed on Apr. 11, 2013, now Pat. No. 8,883,099.

(60) Provisional application No. 61/622,728, filed on Apr. 11, 2012.

(51) Int. Cl.
  B01D 53/50 (2006.01)
  B01D 53/40 (2006.01)
  B01D 15/08 (2006.01)
  B01D 53/34 (2006.01)
  B01D 53/78 (2006.01)
  B01D 53/86 (2006.01)
  B01D 53/96 (2006.01)

(52) U.S. Cl.
  CPC ............. B01D 53/50 (2013.01); B01D 53/64 (2013.01); B01D 53/78 (2013.01); B01D 53/8665 (2013.01); B01D 53/96 (2013.01); B01D 2257/202 (2013.01); B01D 2258/0283 (2013.01); Y10S 210/914 (2013.01)

(58) Field of Classification Search
  CPC ................ B01D 53/64; B01D 2215/00; B01D 2251/108; B01D 2257/302; B01D 2257/602; B01D 2258/0283; B01D 2258/0291
  See application file for complete search history.

(56) References Cited

U.S. PATENT DOCUMENTS

| | | |
|---|---|---|
| 346,765 A | 8/1886 | McIntyre |
| 367,014 A | 7/1887 | Wandrey et al. |
| 537,998 A | 4/1895 | Spring et al. |
| 541,025 A | 6/1895 | Gray |
| 685,719 A | 10/1901 | Harris |
| 700,888 A | 5/1902 | Battistini |
| 744,908 A | 11/1903 | Dallas |
| 846,338 A | 3/1907 | McNamara |
| 894,110 A | 7/1908 | Bloss |
| 896,875 A | 8/1908 | Williams |
| 896,876 A | 8/1908 | Williams |
| 911,960 A | 2/1909 | Ellis |
| 1,112,547 A | 10/1914 | Morin |
| 1,183,445 A | 5/1916 | Foxwell |
| 1,984,164 A | 12/1934 | Stock |
| 2,059,388 A | 11/1936 | Nelms |
| 2,077,298 A | 4/1937 | Zelger |
| 2,089,599 A | 8/1937 | Crecelius |
| 2,511,288 A | 6/1950 | Morrell et al. |
| 3,194,629 A | 7/1965 | Dreibelbis et al. |
| 3,599,610 A | 8/1971 | Spector |
| 3,662,523 A | 5/1972 | Revoir et al. |
| 3,725,530 A | 4/1973 | Kawase et al. |
| 3,754,074 A | 8/1973 | Grantham |
| 3,764,496 A | 10/1973 | Hultman et al. |
| 3,786,619 A | 1/1974 | Melkersson et al. |
| 3,803,803 A | 4/1974 | Raduly et al. |
| 3,826,618 A | 7/1974 | Capuano |
| 3,838,190 A | 9/1974 | Birke et al. |
| 3,849,267 A | 11/1974 | Hilgen et al. |
| 3,849,537 A | 11/1974 | Allgulin |
| 3,851,042 A | 11/1974 | Minnick |
| 3,876,393 A | 4/1975 | Kasai et al. |
| 3,956,458 A | 5/1976 | Anderson |
| 3,961,020 A | 6/1976 | Seki |
| 3,974,254 A | 8/1976 | de la Cuadra Herra et al. |
| 4,075,282 A | 2/1978 | Storp et al. |
| 4,094,777 A | 6/1978 | Sugier et al. |
| 4,101,631 A | 7/1978 | Ambrosini et al. |
| 4,115,518 A | 9/1978 | Delmon et al. |
| 4,140,654 A | 2/1979 | Yoshioka et al. |
| 4,148,613 A | 4/1979 | Myers |
| 4,174,373 A | 11/1979 | Yoshida et al. |
| 4,196,173 A | 4/1980 | Dejong et al. |
| 4,212,853 A | 7/1980 | Fukui |
| 4,233,274 A | 11/1980 | Allgulin |
| 4,262,610 A | 4/1981 | Hein et al. |
| 4,273,747 A | 6/1981 | Rasmussen |
| 4,342,192 A | 8/1982 | Heyn et al. |
| 4,387,653 A | 6/1983 | Voss |
| 4,427,630 A | 1/1984 | Aibe et al. |
| 4,440,100 A | 4/1984 | Michelfelder et al. |
| 4,474,896 A | 10/1984 | Chao |
| 4,500,327 A | 2/1985 | Nishino et al. |
| 4,503,785 A | 3/1985 | Scocca |
| 4,519,995 A | 5/1985 | Schrofelbauer et al. |
| 4,555,392 A | 11/1985 | Steinberg |
| 4,578,256 A | 3/1986 | Nishino et al. |
| 4,626,418 A | 12/1986 | College et al. |
| 4,678,481 A | 7/1987 | Diep |
| 4,693,731 A | 9/1987 | Tarakad et al. |
| 4,708,853 A | 11/1987 | Matviya et al. |
| 4,729,882 A | 3/1988 | Ide et al. |
| 4,751,065 A | 6/1988 | Bowers |
| 4,758,371 A | 7/1988 | Bhatia |
| 4,758,418 A | 7/1988 | Yoo et al. |
| 4,772,455 A | 9/1988 | Izumi et al. |
| 4,779,207 A | 10/1988 | Woracek et al. |
| 4,786,483 A | 11/1988 | Audeh |
| 4,803,059 A | 2/1989 | Sullivan et al. |
| 4,804,521 A | 2/1989 | Rochelle et al. |
| 4,807,542 A | 2/1989 | Dykema |
| 4,814,152 A | 3/1989 | Yan |
| 4,820,318 A | 4/1989 | Chang et al. |
| 4,824,441 A | 4/1989 | Kindig |
| 4,830,829 A | 5/1989 | Craig, Jr. |
| 4,873,930 A | 10/1989 | Egense et al. |
| 4,876,025 A | 10/1989 | Roydhouse |
| 4,886,519 A | 12/1989 | Hayes et al. |
| 4,889,698 A | 12/1989 | Moller et al. |
| 4,892,567 A | 1/1990 | Yan |
| 4,915,818 A | 4/1990 | Yan |
| 4,917,862 A | 4/1990 | Kraw et al. |
| 4,936,047 A | 6/1990 | Feldmann et al. |
| 4,956,162 A | 9/1990 | Smith et al. |
| 4,964,889 A | 10/1990 | Chao |
| 5,013,358 A | 5/1991 | Ball et al. |
| 5,024,171 A | 6/1991 | Krigmont et al. |
| 5,047,219 A | 9/1991 | Epperly et al. |
| 5,049,163 A | 9/1991 | Huang et al. |
| 5,116,793 A | 5/1992 | Chao et al. |
| 5,120,516 A | 6/1992 | Ham et al. |
| 5,122,353 A | 6/1992 | Valentine |
| 5,124,135 A | 6/1992 | Girrbach et al. |
| 5,126,300 A | 6/1992 | Pinnavaia et al. |
| 5,202,301 A | 4/1993 | McNamara |
| 5,238,488 A | 8/1993 | Wilhelm |
| 5,245,120 A | 9/1993 | Srinivasachar et al. |
| 5,277,135 A | 1/1994 | Dubin |
| 5,288,306 A | 2/1994 | Aibe et al. |
| 5,300,137 A | 4/1994 | Weyand et al. |
| 5,320,817 A | 6/1994 | Hardwick et al. |
| 5,328,673 A | 7/1994 | Kaczur et al. |
| 5,336,835 A | 8/1994 | McNamara |
| 5,346,674 A | 9/1994 | Weinwurm et al. |
| 5,350,728 A | 9/1994 | Cameron et al. |
| 5,352,647 A | 10/1994 | Suchenwirth |
| 5,354,363 A | 10/1994 | Brown, Jr. et al. |
| 5,356,611 A | 10/1994 | Herkelmann et al. |
| 5,368,617 A | 11/1994 | Kindig |
| 5,403,548 A | 4/1995 | Aibe et al. |
| 5,409,522 A | 4/1995 | Durham et al. |
| 5,419,834 A | 5/1995 | Straten |

(56) References Cited

U.S. PATENT DOCUMENTS

| | | |
|---|---|---|
| 5,435,843 A | 7/1995 | Roy et al. |
| 5,435,980 A | 7/1995 | Felsvang et al. |
| 5,447,703 A | 9/1995 | Baer et al. |
| 5,460,643 A | 10/1995 | Hasenpusch et al. |
| 5,480,619 A | 1/1996 | Johnson et al. |
| 5,499,587 A | 3/1996 | Rodriquez et al. |
| 5,502,021 A | 3/1996 | Schuster |
| 5,505,746 A | 4/1996 | Chriswell et al. |
| 5,505,766 A | 4/1996 | Chang |
| 5,520,898 A | 5/1996 | Pinnavaia et al. |
| 5,569,436 A | 10/1996 | Lerner |
| 5,571,490 A | 11/1996 | Bronicki et al. |
| 5,575,982 A | 11/1996 | Reiss et al. |
| 5,587,003 A | 12/1996 | Bulow et al. |
| 5,607,496 A | 3/1997 | Brooks |
| 5,607,654 A | 3/1997 | Lerner |
| 5,618,508 A | 4/1997 | Suchenwirth et al. |
| 5,635,150 A | 6/1997 | Coughlin |
| 5,648,508 A | 7/1997 | Yaghi |
| 5,670,122 A | 9/1997 | Zamansky et al. |
| 5,672,323 A | 9/1997 | Bhat et al. |
| 5,674,459 A | 10/1997 | Gohara et al. |
| 5,679,957 A | 10/1997 | Durham et al. |
| 5,695,726 A | 12/1997 | Lerner |
| 5,733,360 A | 3/1998 | Feldman et al. |
| 5,733,516 A | 3/1998 | DeBerry |
| 5,738,834 A | 4/1998 | DeBerry |
| 5,744,109 A | 4/1998 | Sitges Menendez et al. |
| 5,785,932 A | 7/1998 | Helfritch |
| 5,787,823 A | 8/1998 | Knowles |
| 5,809,910 A | 9/1998 | Svendssen |
| 5,809,911 A | 9/1998 | Feizollahi |
| 5,810,910 A | 9/1998 | Ludwig et al. |
| 5,827,352 A | 10/1998 | Altman et al. |
| 5,871,703 A | 2/1999 | Alix et al. |
| 5,875,722 A | 3/1999 | Gosselin et al. |
| 5,891,324 A | 4/1999 | Ohtsuka |
| 5,897,688 A | 4/1999 | Voogt et al. |
| 5,900,042 A | 5/1999 | Mendelsohn et al. |
| 5,910,292 A | 6/1999 | Alvarez, Jr. et al. |
| 5,989,506 A | 11/1999 | Markovs |
| 6,001,152 A | 12/1999 | Sinha |
| 6,013,593 A | 1/2000 | Lee et al. |
| 6,024,931 A | 2/2000 | Hanulik |
| 6,027,551 A | 2/2000 | Hwang et al. |
| 6,080,281 A | 6/2000 | Attia |
| 6,083,403 A | 7/2000 | Tang |
| 6,117,403 A | 9/2000 | Alix et al. |
| 6,132,692 A | 10/2000 | Alix et al. |
| 6,136,072 A | 10/2000 | Sjostrom et al. |
| 6,136,281 A | 10/2000 | Meischen et al. |
| 6,136,749 A | 10/2000 | Gadkaree |
| 6,202,574 B1 | 3/2001 | Liljedahl et al. |
| 6,214,304 B1 | 4/2001 | Rosenthal et al. |
| 6,231,643 B1 | 5/2001 | Pasic et al. |
| 6,248,217 B1 | 6/2001 | Biswas et al. |
| 6,250,235 B1 | 6/2001 | Oehr et al. |
| 6,258,334 B1 | 7/2001 | Gadkaree et al. |
| 6,284,199 B1 | 9/2001 | Downs et al. |
| 6,284,208 B1 | 9/2001 | Thomassen |
| 6,294,139 B1 | 9/2001 | Vicard et al. |
| 6,328,939 B1 | 12/2001 | Amrhein |
| 6,348,178 B1 | 2/2002 | Sudduth et al. |
| 6,368,511 B1 | 4/2002 | Weissenberg et al. |
| 6,372,187 B1 | 4/2002 | Madden et al. |
| 6,375,909 B1 | 4/2002 | Dangtran et al. |
| 6,383,981 B1 | 5/2002 | Blakenship et al. |
| 6,447,740 B1 | 9/2002 | Caldwell et al. |
| 6,475,451 B1 | 11/2002 | Leppin et al. |
| 6,521,021 B1 | 2/2003 | Pennline et al. |
| 6,524,371 B2 | 2/2003 | El-Shoubary et al. |
| 6,528,030 B2 | 3/2003 | Madden et al. |
| 6,533,842 B1 | 3/2003 | Maes et al. |
| 6,558,454 B1 | 5/2003 | Chang et al. |
| 6,576,585 B2 | 6/2003 | Fischer et al. |
| 6,582,497 B1 | 6/2003 | Maes et al. |
| 6,589,318 B2 | 7/2003 | El-Shoubary et al. |
| 6,610,263 B2 | 8/2003 | Pahlman et al. |
| 6,638,347 B2 | 10/2003 | El-Shoubary et al. |
| 6,638,485 B1 | 10/2003 | Lida et al. |
| 6,649,082 B2 | 11/2003 | Hayasaka et al. |
| 6,682,709 B2 | 1/2004 | Sudduth et al. |
| 6,694,900 B2 | 2/2004 | Lissianski et al. |
| 6,702,569 B2 | 3/2004 | Kobayashi et al. |
| 6,719,828 B1 | 4/2004 | Lovell et al. |
| 6,726,888 B2 | 4/2004 | Lanier et al. |
| 6,729,248 B2 | 5/2004 | Johnson et al. |
| 6,732,055 B2 | 5/2004 | Bagepalli et al. |
| 6,737,031 B2 | 5/2004 | Beal et al. |
| 6,773,471 B2 | 8/2004 | Johnson et al. |
| 6,787,742 B2 | 9/2004 | Kansa et al. |
| 6,790,420 B2 | 9/2004 | Breen et al. |
| 6,808,692 B2 | 10/2004 | Oehr |
| 6,818,043 B1 | 11/2004 | Chang et al. |
| 6,827,837 B2 | 12/2004 | Minter |
| 6,841,513 B2 | 1/2005 | El-Shoubary et al. |
| 6,848,374 B2 | 2/2005 | Srinivasachar et al. |
| 6,855,859 B2 | 2/2005 | Nolan et al. |
| 6,860,911 B2 | 3/2005 | Hundley |
| 6,878,358 B2 | 4/2005 | Vosteen et al. |
| 6,883,444 B2 | 4/2005 | Logan et al. |
| 6,916,762 B2 | 7/2005 | Shibuya et al. |
| 6,942,840 B1 | 9/2005 | Broderick |
| 6,945,925 B2 | 9/2005 | Pooler et al. |
| 6,953,494 B2 | 10/2005 | Nelson, Jr. |
| 6,960,329 B2 | 11/2005 | Sellakumar |
| 6,962,617 B2 | 11/2005 | Simpson |
| 6,969,494 B2 | 11/2005 | Herbst |
| 6,972,120 B2 | 12/2005 | Holste et al. |
| 6,974,564 B2 | 12/2005 | Biermann |
| 6,975,975 B2 | 12/2005 | Fasca |
| 7,008,603 B2 | 3/2006 | Brooks et al. |
| 7,013,817 B2 | 3/2006 | Stowe, Jr. et al. |
| 7,017,330 B2 | 3/2006 | Bellows |
| 7,111,591 B2 | 9/2006 | Schwab et al. |
| 7,118,720 B1 | 10/2006 | Mendelsohn et al. |
| 7,141,091 B2 | 11/2006 | Chang |
| 7,153,481 B2 | 12/2006 | Bengtsson et al. |
| 7,156,959 B2 | 1/2007 | Herbst |
| 7,198,769 B2 | 4/2007 | Cichanowicz |
| 7,211,707 B2 | 5/2007 | Axtell et al. |
| 7,217,401 B2 | 5/2007 | Ramme et al. |
| 7,250,387 B2 | 7/2007 | Durante et al. |
| 7,270,063 B2 | 9/2007 | Aradi et al. |
| 7,332,002 B2 | 2/2008 | Johnson et al. |
| 7,361,209 B1 | 4/2008 | Durham et al. |
| 7,381,380 B2 | 6/2008 | Herbst |
| 7,381,387 B2 | 6/2008 | Lissianski et al. |
| 7,381,388 B2 | 6/2008 | Cooper et al. |
| 7,384,615 B2 | 6/2008 | Boardman et al. |
| 7,413,719 B2 | 8/2008 | Digdon |
| 7,416,137 B2 | 8/2008 | Hagen et al. |
| 7,430,969 B2 | 10/2008 | Stowe, Jr. et al. |
| 7,435,286 B2 | 10/2008 | Olson et al. |
| 7,442,239 B2 | 10/2008 | Armstrong et al. |
| 7,452,392 B2 | 11/2008 | Nick et al. |
| 7,468,170 B2 | 12/2008 | Comrie |
| 7,473,303 B1 | 1/2009 | Higgins et al. |
| 7,479,215 B2 | 1/2009 | Carson et al. |
| 7,479,263 B2 | 1/2009 | Chang et al. |
| 7,494,632 B1 | 2/2009 | Klunder |
| 7,497,076 B2 | 3/2009 | Funk et al. |
| 7,507,083 B2 | 3/2009 | Comrie |
| 7,514,052 B2 | 4/2009 | Lissianski et al. |
| 7,514,053 B2 | 4/2009 | Johnson et al. |
| 7,517,511 B2 | 4/2009 | Schofield |
| 7,521,032 B2 | 4/2009 | Honjo et al. |
| 7,524,473 B2 | 4/2009 | Lindau et al. |
| 7,544,338 B2 | 6/2009 | Honjo et al. |
| 7,544,339 B2 | 6/2009 | Lissianski et al. |
| 7,563,311 B2 | 7/2009 | Graham |
| 7,611,564 B2 | 11/2009 | McChesney et al. |
| 7,615,101 B2 | 11/2009 | Holmes et al. |
| 7,622,092 B2 | 11/2009 | Honjo et al. |

(56) References Cited

U.S. PATENT DOCUMENTS

| | | |
|---|---|---|
| 7,651,541 B2 | 1/2010 | Hundley et al. |
| 7,674,442 B2 | 3/2010 | Comrie |
| 7,712,306 B2 | 5/2010 | White et al. |
| 7,713,503 B2 | 5/2010 | Maly et al. |
| 7,722,843 B1 | 5/2010 | Srinivasachar |
| 7,727,307 B2 | 6/2010 | Winkler |
| 7,758,827 B2 | 7/2010 | Comrie |
| 7,767,174 B2 | 8/2010 | Liu et al. |
| 7,776,301 B2 | 8/2010 | Comrie |
| 7,780,765 B2 | 8/2010 | Srinivasachar et al. |
| 7,862,630 B2 | 1/2011 | Hundley et al. |
| 7,906,090 B2 | 3/2011 | Ukai et al. |
| 7,938,571 B1 | 5/2011 | Irvine |
| 7,955,577 B2 | 6/2011 | Comrie |
| 7,988,939 B2 | 8/2011 | Comrie |
| 8,007,749 B2 | 8/2011 | Chang et al. |
| 8,017,550 B2 | 9/2011 | Chao et al. |
| 8,069,797 B2 | 12/2011 | Srinivasachar et al. |
| 8,071,060 B2 | 12/2011 | Ukai et al. |
| 8,101,144 B2 | 1/2012 | Sasson et al. |
| 8,124,036 B1 | 2/2012 | Baldrey et al. |
| 8,226,913 B2 | 7/2012 | Comrie |
| 8,293,196 B1 | 10/2012 | Baldrey et al. |
| 8,303,919 B2 | 11/2012 | Gadgil et al. |
| 8,312,822 B2 | 11/2012 | Holmes et al. |
| 8,313,323 B2 | 11/2012 | Comrie |
| 8,372,362 B2 * | 2/2013 | Durham ............ B01D 53/64 423/210 |
| 8,420,034 B2 * | 4/2013 | Nochi ............ B01D 53/501 423/210 |
| 8,481,455 B1 | 7/2013 | Jain et al. |
| 8,496,894 B2 | 7/2013 | Durham et al. |
| 8,524,179 B2 | 9/2013 | Durham et al. |
| 8,574,324 B2 | 11/2013 | Comrie |
| 8,652,235 B2 | 2/2014 | Olson et al. |
| 8,663,594 B2 | 3/2014 | Kawamura et al. |
| 8,807,056 B2 | 8/2014 | Holmes et al. |
| 8,845,986 B2 | 9/2014 | Senior et al. |
| 8,865,099 B1 * | 10/2014 | Gray ............ B01D 53/64 423/210 |
| 8,883,099 B2 * | 11/2014 | Sjostrom ............ B01D 53/68 423/210 |
| 8,919,266 B2 | 12/2014 | Johnson et al. |
| 8,951,487 B2 | 2/2015 | Durham et al. |
| 8,980,207 B1 | 3/2015 | Gray et al. |
| 9,221,013 B2 | 12/2015 | Sjostrom et al. |
| 9,238,782 B2 | 1/2016 | Senior et al. |
| 9,308,493 B2 | 4/2016 | Filippelli et al. |
| 9,346,012 B2 | 5/2016 | Pennemann et al. |
| 9,352,275 B2 | 5/2016 | Durham et al. |
| 9,409,123 B2 * | 8/2016 | Sjostrom ............ B01D 53/68 |
| 9,416,967 B2 | 8/2016 | Comrie |
| 9,555,369 B2 | 1/2017 | Moore et al. |
| 9,657,942 B2 | 5/2017 | Durham et al. |
| 9,822,973 B2 | 11/2017 | Comrie |
| 9,827,551 B2 * | 11/2017 | Hardwick ............ B01D 53/508 |
| 9,850,442 B2 | 12/2017 | Senior et al. |
| 9,884,286 B2 | 2/2018 | Sjostrom |
| 9,889,405 B2 | 2/2018 | Sjostrom et al. |
| 9,889,451 B2 | 2/2018 | Filippelli et al. |
| 9,957,454 B2 | 5/2018 | Morris et al. |
| 10,124,293 B2 | 11/2018 | Durham et al. |
| 10,159,931 B2 | 12/2018 | Sjostrom et al. |
| 10,427,096 B2 | 10/2019 | Sjostrom et al. |
| 10,465,137 B2 | 11/2019 | Senior et al. |
| 10,589,292 B2 | 3/2020 | Filippelo et al. |
| 10,758,863 B2 * | 9/2020 | Sjostrom ............ B01D 53/50 |
| 2002/0088170 A1 | 7/2002 | Sanyal |
| 2002/0114749 A1 | 8/2002 | Cole |
| 2002/0134242 A1 | 9/2002 | Yang et al. |
| 2002/0150516 A1 | 10/2002 | Pahlman |
| 2003/0065236 A1 | 4/2003 | Vosteen et al. |
| 2003/0099585 A1 | 5/2003 | Allgulin |
| 2003/0104937 A1 | 6/2003 | Sinha |
| 2003/0164309 A1 | 9/2003 | Nakamura et al. |
| 2003/0166988 A1 | 9/2003 | Hazen et al. |
| 2003/0192234 A1 | 10/2003 | Logan et al. |
| 2003/0196578 A1 | 10/2003 | Logan et al. |
| 2003/0206843 A1 | 11/2003 | Nelson, Jr. |
| 2003/0206846 A1 | 11/2003 | Jangbarwala |
| 2003/0226312 A1 | 12/2003 | Roos et al. |
| 2004/0013589 A1 | 1/2004 | Vosteen et al. |
| 2004/0040438 A1 | 3/2004 | Baldrey et al. |
| 2004/0063210 A1 | 4/2004 | Steichen et al. |
| 2004/0076570 A1 | 4/2004 | Jia |
| 2004/0109800 A1 | 6/2004 | Pahlman |
| 2004/0129607 A1 | 7/2004 | Slater et al. |
| 2005/0019240 A1 | 1/2005 | Lu et al. |
| 2005/0026008 A1 | 2/2005 | Heaton et al. |
| 2005/0074380 A1 | 4/2005 | Hammel et al. |
| 2005/0169824 A1 | 8/2005 | Downs et al. |
| 2005/0227146 A1 | 10/2005 | Ghantous et al. |
| 2005/0260112 A1 | 11/2005 | Hensman |
| 2006/0027488 A1 | 2/2006 | Gauthier |
| 2006/0029531 A1 | 2/2006 | Breen et al. |
| 2006/0051270 A1 | 3/2006 | Brunette |
| 2006/0090678 A1 | 5/2006 | Kriech |
| 2006/0112823 A1 | 6/2006 | Avin |
| 2006/0124444 A1 | 6/2006 | Nakamura et al. |
| 2006/0185226 A1 | 8/2006 | McDonald et al. |
| 2006/0191835 A1 | 8/2006 | Petrik et al. |
| 2006/0205592 A1 | 9/2006 | Chao et al. |
| 2007/0140940 A1 | 6/2007 | Varma et al. |
| 2007/0156288 A1 | 7/2007 | Wroblewski et al. |
| 2007/0167309 A1 | 7/2007 | Olson |
| 2007/0168213 A1 | 7/2007 | Comrie |
| 2007/0179056 A1 | 8/2007 | Back et al. |
| 2007/0180990 A1 | 8/2007 | Downs et al. |
| 2007/0184394 A1 | 8/2007 | Comrie |
| 2007/0234902 A1 | 10/2007 | Fair et al. |
| 2007/0281253 A1 | 12/2007 | Toqan |
| 2007/0295347 A1 | 12/2007 | Paine et al. |
| 2008/0017337 A1 | 1/2008 | Duggirala |
| 2008/0090951 A1 | 4/2008 | Mao et al. |
| 2008/0107579 A1 | 5/2008 | Downs et al. |
| 2008/0115704 A1 | 5/2008 | Berry et al. |
| 2008/0134888 A1 | 6/2008 | Chao et al. |
| 2008/0182747 A1 | 7/2008 | Sinha |
| 2008/0207443 A1 | 8/2008 | Gadkaree et al. |
| 2008/0292512 A1 | 11/2008 | Kang |
| 2009/0007785 A1 | 1/2009 | Kimura et al. |
| 2009/0031708 A1 | 2/2009 | Schmidt |
| 2009/0031929 A1 | 2/2009 | Boardman et al. |
| 2009/0062119 A1 | 3/2009 | Olson et al. |
| 2009/0081092 A1 | 3/2009 | Yang et al. |
| 2009/0104097 A1 | 4/2009 | Dunson, Jr. |
| 2009/0136401 A1 | 5/2009 | Yang et al. |
| 2009/0148372 A1 | 6/2009 | Keiser |
| 2009/0235848 A1 | 9/2009 | Eiteneer et al. |
| 2009/0287013 A1 | 11/2009 | Morrison |
| 2009/0320678 A1 | 12/2009 | Chang et al. |
| 2010/0025302 A1 | 2/2010 | Sato et al. |
| 2010/0047146 A1 | 2/2010 | Olson et al. |
| 2010/0189617 A1 | 7/2010 | Hundley et al. |
| 2010/0189618 A1 | 7/2010 | White et al. |
| 2011/0030592 A1 | 2/2011 | Baldrey et al. |
| 2011/0076210 A1 | 3/2011 | Pollack et al. |
| 2011/0168018 A1 | 7/2011 | Mohamadalizadeh et al. |
| 2011/0250111 A1 | 10/2011 | Pollack et al. |
| 2011/0262873 A1 | 10/2011 | Nalepa et al. |
| 2011/0281222 A1 | 11/2011 | Comrie |
| 2012/0124893 A1 | 5/2012 | McRobbie et al. |
| 2012/0216729 A1 | 8/2012 | Baldrey et al. |
| 2012/0272877 A1 | 11/2012 | Comrie |
| 2012/0311924 A1 | 12/2012 | Richardson et al. |
| 2013/0074745 A1 | 3/2013 | Comrie |
| 2013/0078169 A1 | 3/2013 | LaFlesh et al. |
| 2013/0139738 A1 | 6/2013 | Grubbström et al. |
| 2013/0149206 A1 * | 6/2013 | Ukai ............ B01D 53/75 422/170 |
| 2013/0312646 A1 | 11/2013 | Comrie |
| 2013/0330257 A1 | 12/2013 | Tramposch et al. |
| 2014/0030178 A1 | 1/2014 | Martin |
| 2014/0140908 A1 | 5/2014 | Nalepa et al. |

(56) References Cited

U.S. PATENT DOCUMENTS

| | | |
|---|---|---|
| 2014/0141380 A1 | 5/2014 | Comrie |
| 2014/0202069 A1 | 7/2014 | Aradi et al. |
| 2014/0213429 A1 | 7/2014 | Nochi et al. |
| 2014/0245936 A1 | 9/2014 | Pollack et al. |
| 2014/0271418 A1 | 9/2014 | Keiser et al. |
| 2014/0299028 A1 | 10/2014 | Kotch et al. |
| 2014/0308191 A1 | 10/2014 | Mazyck et al. |
| 2014/0341793 A1 | 11/2014 | Holmes et al. |
| 2015/0086457 A1* | 3/2015 | Kagawa ............... B01D 53/75 423/239.1 |
| 2015/0096480 A1 | 4/2015 | Comrie |
| 2016/0025337 A1 | 1/2016 | Comrie |
| 2016/0166982 A1 | 6/2016 | Holmes et al. |
| 2016/0339385 A1 | 11/2016 | Mimna et al. |
| 2017/0050147 A1 | 2/2017 | Denny et al. |
| 2017/0292700 A1 | 10/2017 | Comrie |
| 2018/0223206 A1 | 8/2018 | Morris et al. |
| 2018/0224121 A1 | 8/2018 | Comrie |
| 2019/0076781 A1 | 3/2019 | Sjostrom et al. |
| 2019/0118141 A1 | 4/2019 | Durham et al. |
| 2019/0321778 A1 | 10/2019 | Sjostrom et al. |
| 2020/0071629 A1 | 3/2020 | Senior et al. |

FOREIGN PATENT DOCUMENTS

| | | | |
|---|---|---|---|
| CA | 2026056 | 3/1992 | |
| CA | 2150529 | 12/1995 | |
| CA | 2400898 | 8/2001 | |
| CA | 2418578 | 8/2003 | |
| CA | 2435474 | 1/2004 | |
| CA | 2584327 | 4/2006 | |
| CA | 2641311 | 8/2007 | |
| CA | 2737281 | 4/2010 | |
| CN | 1048173 | 1/1991 | |
| CN | 1177628 | 4/1998 | |
| CN | 1354230 | 6/2002 | |
| CN | 1382657 | 12/2002 | |
| CN | 1421515 | 6/2003 | |
| CN | 1488423 | 4/2004 | |
| CN | 101048218 | 10/2007 | |
| CN | 101053820 | 10/2007 | |
| CN | 101175550 | 5/2008 | |
| CN | 101347722 | 1/2009 | |
| CN | 101489647 | 7/2009 | |
| CN | 101816922 | 9/2010 | |
| CN | 101932376 A * | 12/2010 | ......... B01D 53/8656 |
| CN | 105188910 | 12/2015 | |
| CN | 105381680 | 3/2016 | |
| DE | 2548845 | 5/1976 | |
| DE | 3426059 | 1/1986 | |
| DE | 3615759 | 11/1987 | |
| DE | 3628963 | 3/1988 | |
| DE | 3711503 | 10/1988 | |
| DE | 3918292 | 4/1990 | |
| DE | 4218672 | 8/1993 | |
| DE | 4308388 | 10/1993 | |
| DE | 4339777 | 5/1995 | |
| DE | 4422661 | 1/1996 | |
| DE | 19520127 | 12/1996 | |
| DE | 19745191 | 4/1999 | |
| DE | 19850054 | 5/2000 | |
| DE | 10233173 | 7/2002 | |
| EP | 0208036 | 1/1987 | |
| EP | 0208490 | 1/1987 | |
| EP | 0220075 | 4/1987 | |
| EP | 0254697 | 1/1988 | |
| EP | 0274132 | 7/1988 | |
| EP | 0433677 | 6/1991 | |
| EP | 0435848 | 7/1991 | |
| EP | 0628341 | 12/1994 | |
| EP | 0666098 | 8/1995 | |
| EP | 0709128 | 5/1996 | |
| EP | 0794240 | 9/1997 | |
| EP | 0908217 | 4/1999 | |
| EP | 1040865 | 10/2000 | |
| EP | 1213046 | 10/2001 | |
| EP | 1199354 | 4/2002 | |
| EP | 1271053 | 1/2003 | |
| EP | 1386655 | 2/2004 | |
| EP | 1570894 | 9/2005 | |
| EP | 1903092 | 3/2008 | |
| EP | 2452740 | 5/2012 | |
| ES | 2 443 580 T3 * | 2/2014 | ......... B01D 53/8625 |
| FR | 1394547 | 4/1965 | |
| GB | 1121845 | 7/1968 | |
| GB | 2122916 | 1/1984 | |
| GB | 2441885 | 3/2008 | |
| JP | 49-53590 | 5/1974 | |
| JP | 49-53591 | 5/1974 | |
| JP | 49-53592 | 5/1974 | |
| JP | 49-53593 | 5/1974 | |
| JP | 49-53594 | 5/1974 | |
| JP | 59-10343 | 1/1984 | |
| JP | 59-76537 | 5/1984 | |
| JP | 59-160534 | 9/1984 | |
| JP | 63-100918 | 5/1988 | |
| JP | H02-303519 | 12/1990 | |
| JP | H10-5537 | 1/1998 | |
| JP | 10-109016 | 4/1998 | |
| JP | 2000-197811 | 7/2000 | |
| JP | 2000-205525 | 7/2000 | |
| JP | 2000-325747 | 11/2000 | |
| JP | 2001-347131 | 12/2001 | |
| JP | 2003-065522 | 3/2003 | |
| JP | 2004-066229 | 3/2004 | |
| JP | 2005-230810 | 9/2005 | |
| JP | 5064389 | 10/2012 | |
| KR | 2004-0010276 | 1/2004 | |
| KR | 100440845 | 7/2004 | |
| RU | 2007 138 432 A * | 4/2009 | ............. B01J 20/16 |
| RU | 2007-138432 | 4/2009 | |
| RU | 2515988 | 5/2014 | |
| RU | 2535684 | 12/2014 | |
| WO | WO 96/14137 | 5/1996 | |
| WO | WO 96/30318 | 10/1996 | |
| WO | WO 97/44500 | 11/1997 | |
| WO | WO 98/15357 | 4/1998 | |
| WO | WO 99/58228 | 11/1999 | |
| WO | WO 2001/38787 | 5/2001 | |
| WO | WO 01/62368 | 8/2001 | |
| WO | WO 02/28513 | 4/2002 | |
| WO | WO 03/072241 | 9/2003 | |
| WO | WO 2003/093518 | 11/2003 | |
| WO | WO 2004/089501 | 10/2004 | |
| WO | WO 2004/094024 | 11/2004 | |
| WO | WO 2005/092477 | 10/2005 | |
| WO | WO 2006/037213 | 4/2006 | |
| WO | WO 2006/039007 | 4/2006 | |
| WO | WO 2006/091635 | 8/2006 | |
| WO | WO 2006/096993 | 9/2006 | |
| WO | WO 2006/099611 | 9/2006 | |
| WO | WO 2009/018539 | 2/2009 | |
| WO | WO 2009107731 A1 * | 9/2009 | ......... B01D 53/8656 |
| WO | WO 2010/123609 | 10/2010 | |
| ZA | 2003-05568 | 7/2004 | |

OTHER PUBLICATIONS

U.S. Appl. No. 14/512,142, filed Oct. 10, 2014.
U.S. Appl. No. 15/217,749, filed Jul. 22, 2016.
U.S. Appl. No. 15/694,536, filed Sep. 1, 2017.
U.S. Appl. No. 16/188,758, filed Nov. 13, 2018.
U.S. Appl. No. 11/533,849, filed Oct. 27, 2006, now issed as U.S. Pat. No. 8,124,036.
U.S. Appl. No. 13/198,381, filed Aug. 4, 2011, now issued as U.S. Pat. No. 8,293,196.
U.S. Appl. No. 13/021,427, filed Feb. 4, 2011, now issued as U.S. Pat. No. 8,372,362.
U.S. Appl. No. 13/281,040, filed Oct. 25, 2011, now issued as U.S. Pat. No. 8,496,894.
U.S. Appl. No. 13/925,311, filed Jun. 24, 2013, now issued as U.S. Pat. No. 9,352,275.

(56) References Cited

OTHER PUBLICATIONS

U.S. Appl. No. 14/339,233, filed Jul. 23, 2014, now issued as U.S. Pat. No. 9,221,013.
U.S. Appl. No. 14/949,524, filed Nov. 23, 2015, now issued as U.S. Pat. No. 9,884,286.
U.S. Appl. No. 15/850,780, filed Dec. 21, 2017, now issued as U.S. Pat. No. 10,427,096.
U.S. Appl. No. 16/503,239, filed Jul. 3, 2019.
U.S. Appl. No. 13/471,015, filed May 14, 2012, now issued as U.S. Pat. No. 8,845,986.
U.S. Appl. No. 14/484,001, filed Sep. 11, 2014, now issued as U.S. Pat. No. 9,238,782.
U.S. Appl. No. 14/958,327, filed Dec. 3, 2015, now issued as U.S. Pat. No. 9,850,442.
U.S. Appl. No. 15/812,993, filed Nov. 14, 2017, now issued as U.S. Pat. No. 10,465,137.
U.S. Appl. No. 16/590,178, filed Oct. 1, 2019.
U.S. Appl. No. 16/909,638, filed Jun. 23, 2020.
U.S. Appl. No. 13/281,066, filed Oct. 25, 2011, now issued as U.S. Pat. No. 8,524,179.
U.S. Appl. No. 13/920,658, filed Jun. 18, 2013, now issued as U.S. Pat. No. 8,951,487.
U.S. Appl. No. 14/604,153, filed Jan. 23, 2015, now issued as U.S. Pat. No. 9,657,942.
U.S. Appl. No. 15/488,244, filed Apr. 14, 2017, now issued as U.S. Pat. No. 10,124,293.
U.S. Appl. No. 16/186,187, filed Nov. 9, 2018.
U.S. Appl. No. 16/910,901, filed Jun. 24, 2020.
U.S. Appl. No. 13/861,162, filed Apr. 11, 2013, now issued as U.S. Pat. No. 8,883,099.
U.S. Appl. No. 14/512,142, filed Oct. 10, 2014, now issued as U.S. Pat. No. 9,409,123.
U.S. Appl. No. 15/217,749, filed Jul. 22, 2016, now issued as U.S. Pat. No. 9,889,405.
U.S. Appl. No. 15/694,536, filed Sep. 1, 2017, now issued as U.S. Pat. No. 10,159,931.
U.S. Appl. No. 13/964,441, filed Aug. 12, 2013, now issued as U.S. Pat. No. 9,957,454.
U.S. Appl. No. 15/941,522, filed Mar. 30, 2018.
U.S. Appl. No. 16/917,270, filed Jun. 30, 2020.
U.S. Appl. No. 14/460,817, filed Aug. 15, 2014, now issued as U.S. Pat. No. 9,308,493.
U.S. Appl. No. 15/096,056, filed Apr. 11, 2016, now issued as U.S. Pat. No. 9,889,451.
U.S. Appl. No. 15/842,636, filed Dec. 14, 2017, now issued as U.S. Pat. No. 10,589,292.
Notice of Protest for Canadian Application No. 2793326, mailed Feb. 14, 2019, 12 pages.
Suzuki et al., "Instrumental neutron activation analysis for coal," Bunseki Kagaku, vol. 34, No. 5, 1985, pp. 217-223 (with English abstract).
U.S. Appl. No. 16/909,638, filed Jun. 23, 2020, Senior et al.
U.S. Appl. No. 16/910,901, filed Jun. 24, 2020, Durham et al.
U.S. Appl. No. 16/917,270, filed Jun. 30, 2020, Morris et al.
"Continuous Emissions Monitors (CEMs): Field Studies of Dioxin/Furan CEMs," printed on Apr. 22, 2012, available at www.ejnet.org/toxics/cems/dioxin.html, 5 pages.
"Doe Announces Further Field Testing of Advanced Mercury Control Technologies, Six Projects Selected in Round 2 to Address Future Power Plant Mercury Reduction Initiatives," TECHNews From the National Energy Technology Laboratory, Nov. 5, 2004, available at http://www.netl.doe.gov/publications/TechNews/tn_mercury-control.html, printed on Jun. 3, 2009, pp. 1-2.
"Enhanced Mercury Control: KNX™ Coal Additive Technology," Alstom Power Inc., printed Aug. 3, 2006, 1 page.
"Evaluation of Sorbent Injection for Mercury Control at Great River Energy Coal Creek Station," ADA Environmental Solutions, Nov. 16-20, 2003 Final Report, Electric Power Research Institute, issued Mar. 3, 2004, 32 pages.

"Exclusive license agreement for an innovative mercury oxidation technology," Alstom Power Inc., printed Nov. 2, 2006, 1 page.
"Fuel Ash Effects on Boiler Design and Operation," Chapter 21 of Steam/Its Generation and Use, Babcock & Wilcox Company, 2005, 41st Edition, pp. 21-1 to 21-27.
"Fuel-ash Effects on Boiler Design and Operation," Chapter 15 of Steam/Its Generation and Use, Babcock and Wilcox Company, 1972, 38th Edition, pp. 15-1 to 15-26.
"Full-Scale Testing of Enhanced Mercury Control Technologies for Wet FGD Systems: Final Report for the Period Oct. 1, 2000 to Jun. 30, 2002," submitted by McDermott Technology, Inc., May 7, 2003, 151 pages.
"Gas Phase Filtration," Vaihtoilma White Air Oy, date unknown, 3 pages.
"Impregnated Activated Carbon," Products and Technologies Website, as early as 1999, available at http://www.calgoncarbon.com/product/impregnated.html, printed on Dec. 18, 1999, p. 1.
"Kaolinite Sorbent for the Removal of Heavy Metals from Incinerated Lubricating Oils," EPA Grant No. R828598C027, 1996, retrieved from https://cfpub.epa.gov/ncer_abstracts/index.cfm/fuseaction/display.highlight/abstract/1166, 7 pages.
"Mercury Emission Control Utilizing the Chem-Mod Process," Chem-Mod, EUEC 2011, 34 pages (submitted in 2 parts).
"Mercury Study Report to Congress—Volume VIII: An Evaluation of Mercury Control Technologies and Costs," U.S. EPA, Office of Air Quality Planning & Standards and Office of Research and Development, Dec. 1997, 207 pages.
"Mercury," Pollution Prevention and Abatement Handbook 1998, World Bank Group, effective Jul. 1998, pp. 219-222.
"Nusorb® Mersorb® Family of Adsorbents for Mercury Control," Nucon International Inc., date unknown, 3 pages.
"Protecting Human Health. Mercury Poisoning," US EPA Website, as early as Oct. 8, 1999, available at http://www.epa.gov/region02/health/mercury/, printed on Feb. 5, 2002, pp. 1-4.
"Sample Collection Media: Sorbent Sample Tubes," SKC 1997 Comprehensive Catalog & Air Sampling Guide: The Essential Reference for Air Sampling, pp. 23-24.
"Sodium Hypochlorite," Wikipedia, The Free Encyclopedia, http://en.wikipedia.org/wiki/Sodium_hypochlorite (page last modified on Jul. 7, 2011 at 18:12), 7 pages.
"Texas Genco, EPRI, and URS Corporation Test Innovative Mercury Control Method at Limestone Station—Technology Aims to Capture More Mercury from Power Plant Exhaust," News Release, Jan. 11, 2005, available at http://amptest.epri.com/corporate/discover_epri/news/2005/011105_mercury.html, printed on Apr. 24, 2009, pp. 1-2.
"The Fire Below: Spontaneous combustion in Coal," U.S. Department of Energy, Environmental Safety & Health Bulletin, DOE/EH-0320, May 1993, Issue No. 93-4, 9 pages.
"Incineration," Focus on your success, Bayer Industry Services, retrieved from www.entsorgung.bayer.com/index.cfmPAGE-ID=301, Jun. 2, 2005, 2 pages.
Anders et al., "Selenium in Coal-Fired Steam Plant Emissions," Environmental Science & Technology, 1975, vol. 9, No. 9, pp. 856-858.
Ariya et al., "Reactions of Gaseous Mercury with Atomic and Molecular Halogens: Kinetics, Product Studies, and Atmospheric Implications," J. Phys. Chem. A, 2002, vol. 106(32), pp. 7310-7320.
Bansal et al., Active Carbon, Marcel Dekker, Inc., New York, 1989, pp. 1-3, 24-29, 391-394, 457.
Beer, J. M., "Combustion technology developments in power generation in response to environmental challenges," Progress in Energy and Combustion Science, 2000, vol. 26, pp. 301-327.
Biswas et al., "Control of Toxic Metal Emissions from Combustors Using Sorbents: A Review," J. Air & Waste Manage. Assoc., Feb. 1998, vol. 48, pp. 113-127.
Bloom, "Mercury Speciation in Flue Gases: Overcoming the Analytical Difficulties," presented at EPRI Conference, Managing Hazardous Air Pollutants, State of the Arts, Washington D.C., Nov. 1991, pp. 148-160.
Blythe et al., "Investigation of Mercury Control by Wet FGD Systems," Power Plant Air Pollution Mega Symposium, Baltimore, MD, Aug. 20-23, 2012, 16 pages.

(56) References Cited

OTHER PUBLICATIONS

Blythe et al., "Optimization of Mercury Control on a New 800-MW PRB-Fired Power Plant," Power Plant Air Pollution Mega Symposium, Baltimore, MD, Aug. 20-23, 2012, 14 pages.
Brigatti et al., "Mercury adsorption by montmorillonite and vermiculite: a combined XRD, TG-MS, and EXAFS study," Applied Clay Science, 2005, vol. 28, pp. 1-8.
Brown et al., "Mercury Measurement and Its Control: What We Know, Have Learned, and Need to Further Investigate," J. Air & Waste Manage. Assoc, Jun. 1999, pp. 1-97.
Buschmann et al., "The KNX™ Coal Additive Technology A Simple Solution for Mercury Emissions Control," Alstom Power Environment, Dec. 2005, pp. 1-7.
Bustard et al., "Full-Scale Evaluation of Sorbent Injection for Mercury Control on Coal-Fired Power Plants," Air Quality III, ADA Environmental Solutions, LLC, Arlington, VA, Sep. 12, 2002, 15 pages.
Butz et al., "Options for Mercury Removal from Coal-Fired Flue Gas Streams: Pilot-Scale Research on Activated Carbon, Alternative and Regenerable Sorbents," 17th Annual Int. Pittsburgh Coal Conf. Proceedings, Pittsburgh, PA, Sep. 11-14, 2000, 25 pages.
Calgon Carbon product and bulletin webpages, printed Jul. 1, 2001, 11 pages.
Cao et al., "Impacts of Halogen Additions on Mercury Oxidation, in a Slipstream Selective Catalyst Reduction (SCR), Reactor When Burning Sub-Bituminous Coal," Environ. Sci. Technol. XXXX, xxx, 000-000, accepted Oct. 22, 2007, pp. A-F.
Carey et al., "Factors Affecting Mercury Control in Utility Flue Gas Using Activated Carbon," J. Air & Waste Manage. Assoc., Dec. 1998, vol. 48, pp. 1166-1174.
De Vito et al., "Sampling and Analysis of Mercury in Combustion Flue Gas," Presented at the Second International Conference on Managing Hazardous Air Pollutants, Washington, DC, Jul. 13-15, 1993, pp. VII39-VII-65.
Donnet et al., eds., Carbon Black: Science and Technology, 2nd Edition, Marcel Dekker, New York, 1993, pp. 182-187, 218-219.
Dunham et al., "Investigation of Sorbent Injection for Mercury Control in Coal-Fired Boilers," Energy & Environmental Research Center, University of North Dakota, Sep. 10, 1998, 120 pages.
Durham et al., "Full-Scale Evaluation of Mercury Control by Injecting Activated Carbon Upstream of ESPS," Air Quality IV Conference, ADA Environmental Solutions, Littleton, Colorado, Sep. 2003, 15 pages.
Edwards et al., "A Study of Gas-Phase Mercury Speciation Using Detailed Chemical Kinetics," in Journal of the Air and Waste Management Association, vol. 51, Jun. 2001, pp. 869-877.
Element Analysis of COALQUAL Data; http://energy.er.usgs.gov/temp/1301072102.htm, printed Mar. 25, 2011, 7 pages.
Elliott, "Standard Handbook of PowerPlant Engineering," excerpts from pp. 4.77-4.78, 4.109-4.110, 6.3-6.4, 6.57-6.63, McGraw Hill, Inc., 1989, 15 pages.
Fabian et al., "How Bayer incinerates wastes," Hydrocarbon Processing, Apr. 1979, pp. 183-192.
Felsvang et al., "Activated Carbon Injection in Spray Dryer/ESP/FF for Mercury and Toxics Control," 1993, pp. 1-35.
Felsvang, K. et al., "Air Toxics Control by Spray Dryer," Presented at the 1993 SO2 Control Symposium, Aug. 24-27, 1993, Boston, MA, 16 pages.
Felsvang, K. et al., "Control of Air Toxics by Dry FGDSystems," Power-Gen '92 Conference, 5th International Conference & Exhibition for the Power Generating Industries, Orlando, FL, Nov. 17-19, 1992, pp. 189-208.
Fujiwara et al., "Mercury transformation behavior on a bench-scale coal combustion furnace," Transactions on Ecology and the Environment, 2001, vol. 47, pp. 395-404.
Galbreath et al., "Mercury Transformations in Coal Combustion Flue Gas," Fuel Processing Technology, 2000, vol. 65-66, pp. 289-310.

Gale, "Mercury Adsorption and Oxidation Kinetics in Coal-Fired Flue Gas," Proceedings of the 30th International Technical Conference on Coal Utilization & Fuel Systems, 2005, pp. 979-990.
Gale, "Mercury Control with Calcium-Based Sorbents and Oxidizing Agents," Final Report of Southern Research Institute, Jul. 2005, 137 pages.
Gale, "Mercury Control with Calcium-Based Sorbents and Oxidizing Agents," Southern Research Institute, Mercury Control Technology R&D Program Review Meeting, Aug. 12-13, 2003, 25 pages.
Gale et al., "Mercury Speciation as a Function of Flue Gas Chlorine Content and Composition in a 1 MW Semi-Industrial Scale Coal-Fired Facility," In Proceedings of the Mega Symposium and Air & Waste Management Association's Specialty Conference, Washington, DC, May 19-22, 2003, Paper 28, 19 pages.
Geiger et al, "Einfluß des Schwefels auf Die Doxin—und Furanbuilding bei der Klärschlammverbrennung," VGB Kraftwerkstechnik, 1992, vol. 72, pp. 159-165.
Ghorishi et al., "Effects of Fly Ash Transition Metal Content and Flue Gas HCI/SO2 Ratio on Mercury Speciation in Waste Combustion," in Environmental Engineering Science, Nov. 2005, vol. 22, No. 2, pp. 221-231.
Ghorishi et al., "In-Flight Capture of Elemental Mercury by a Chlorine-Impregnated Activated Carbon," presented at the Air & Waste Management Association's 94h Annual Meeting & Exhibition, Orlando, FL, Jun. 2001, pp. 1-14.
Ghorishi, "Fundamentals of Mercury Speciation and Control in Coal-Fired Boilers," EAP Research and Development, EPA-600/R-98-014, Feb. 1998, pp. 1-26.
Granite et al., "Novel Sorbents for Mercury Removal from Flue Gas," National Energy Technology Laboratory, Apr. 2000, 10 pages.
Granite et al., "Sorbents for Mercury Removal from Flue Gas," U.S. Dept. of Energy, Report DOE/FETC/TR--98-01, Jan. 1998, 50 pages.
Granite et al. "The thief process for mercury removal from flue gas," Journal of environmental management 84.4 (2007):628-634.
Griffin, "A New Theory of Dioxin Formation in Municipal Solid Waste Combustion," Chemosphere, 1986, vol. 15, Nos. 9-12, pp. 1987-1990.
Griswell et al., "Progress Report on Mercury Control Retrofit at the Colstrip Power Station," Power Plant Air Pollutant Control "MEGA" Symposium, Paper #91, Aug. 30-Sep. 2, 2010, pp. 1-23.
Gullet, B.K. et al, "The Effect of Sorbent Injection Technologies on Emissions of Coal-Based, Based, Metallic Air Toxics," Proceedings of the 1993 S02 Control Symposium, vol. 2, U.S. EPA (Research Triangle Park, NC) Session 6A, Boston, MA, Aug. 24-27, 1993, 26 pages.
Gullett, B. et al., "Bench-Scale Sorption and Desorption of Mercury with Activated Carbon," Presented at the 1993 International Conference on Municipal Waste Combustion, Williamsburg, VA, Mar. 30-Apr. 2, 1993, pp. 903-917.
Gullett, B. et al., "Removal of Illinois Coal-Based Volatile Tracy Mercury," Final Technical Report, Sep. 1, 1996 through Aug. 31, 1997, 2 pages.
Guminski, "The Br—Hg (Bromine-Mercury) System," Journal of Phase Equilibria, Dec. 2000, vol. 21, No. 6, pp. 539-543.
Gutberlet et al., "The Influence of Induced Oxidation on the Operation of Wet FGD Systems," Air Quality V Conference, Arlington, VA, Sep. 19-21, 2005, 15 pages.
Hall et al., "Chemical Reactions of Mercury in Combustion Flue Gases," Water, Air, and Soil Pollution, 1991, vol. 56, pp. 3-14.
Hein, K.R.G. et al., Research Report entitled, "Behavior of Mercury Emission from Coal Sewage Sludge Co-combustion Taking into Account the Gaseous Species," Förderkennzeichen: PEF 398002, Apr. 2001 (English Abstract).
Henning et al., "Impregnated activated carbon for environmental protection," Gas Separation & Purification, Butterworth-Heinemann Ltd., Feb. 1993, vol. 7(4), pp. 235-240.
Ismo et al., "Formation of Aromatic Chlorinated Compounds Catalyzed by Copper and Iron," Chemosphere, 1997, vol. 34(12), pp. 2649-2662.

(56) References Cited

OTHER PUBLICATIONS

Jeong et al. "Nox Removal by Selective Noncatalytic Reduction with Urea Solution in a Fluidized Bed Reactor," Korean Journal of Chemical Engineering, Sep. 1999, vol. 16, No. 5, pp. 614-617.

Jozewicz et al., "Bench-Scale Scale Investigation of Mechanisms of Elemental Mercury Capture by Activated Carbon," Presented at the Second International Conference on Managing Hazardous Air Pollutants, Washington, D.C., Jul. 13-15, 1993, pp. VII-85 through VII-99.

Julien et al., "The Effect of Halides on Emissions from Circulating Fluidized Bed Combustion of Fossil Fuels," Fuel, Nov. 1996, vol. 75(14), pp. 1655-1663.

Kaneko et al., "Pitting of stainless steel in bromide, chloride and bromide/chloride solutions," Corrosion Science, 2000, vol. 42(1), pp. 67-78.

Kellie et al., "The Role of Coal Properties on Chemical and Physical Transformation on Mercury in Post Combustion," presented at Air Quality IV Conference, Arlington, VA, Sep. 2003, pp. 1-14.

Kilgroe et al. "Fundamental Science and Engineering of Mercury Control in Coal-Fired Power Plants," presented at Air Quality IV Conference, Arlington, VA, Sep. 2003, 15 pages.

Kilgroe et al., "Control of Mercury Emissions from Coal-Fired Electric Utility Boilers: Interim Report including Errata dated Mar. 21, 2002," prepared by National Risk Management Research Laboratory, U.S. EPA Report EPA-600/R-01-109, Apr. 2002, 485 pages.

Kobayashi, "Japan EnviroChemicals, Ltd. Overview," Feb. 3, 2002, 3 pages.

Kramlich, "The Homogeneous Forcing of Mercury Oxidation to Provide Low-Cost Capture," Abstract, University of Washington, Department of Mechanical Engineering, Mar. 25, 2004, available at http://www.netl.doe.gov/publications/proceedings/04/UCR-HBCU/abstracts/Kramlich.pdf, pp. 1-2.

Krishnan et al., "Mercury Control by Injection of Activated Carbon and Calcium-Based Based Sorbents," Solid Waste Management: Thermal Treatment and Waste-to-Energy Technologies, U.S. EPA and AWMA, Washington, DC, Apr. 18-21, 1995, pp. 493-504.

Krishnan et al., "Mercury Control in Municipal Waste Combustors and Coal Fired Utilities," Environmental Progress, ProQuest Science Journals, Spring 1997, vol. 16, No. 1, pp. 47-53.

Krishnan et al., "Sorption of Elemental Mercury by Activated Carbons," Environmental Science and Technology, 1994, vol. 28, No. 8, pp. 1506-1512.

Lee et al., "Mercury Control Research: Effects of Fly Ash and Flue Gas Parameters on Mercury Speciation," U.S. Environmental Protection Agency National Risk Management Research Laboratory and ARCADIS, as early as 1998, Geraghy & Miller, Inc., pp. 221-238, Research Triangle Park, NC.

Lee et al., "Pilot-Scale Study of the Effect of Selective Catalytic Reduction Catalyst on Mercury Speciation in Illinois and Powder River Basin Coal Combustion Flue Gases," J. Air & Waste Manage. Assoc., May 2006, vol. 56, pp. 643-649.

Lemieux et al., "Interactions Between Bromine and Chlorine in a Pilot-Scale Hazardous Waste Incinerator," paper presented at 1996 International Incineration Conference, Savannah, GA, May 6-10, 1996, 14 pages.

Li et al., "Effect of Moisture on Adsorption of Elemental Mercury by Activated Carbons," Report No. EPA/600/A-00/104, U.S. EPA, Office of Research and Development Nation Risk Management, Research Laboratory (10-65), 2000, pp. 1-Li to 13-Li.

Li et al., "Mercury Emissions Control in Coal Combustion Systems Using Postassium Iodide: Bench-Scale and Pilot-Scale Studies," Energy & Fuels, Jan. 5, 2009, vol. 23, pp. 236-243.

Linak et al., "Toxic Metal Emissions from Incineration: Mechanisms and Control," Progress in Energy & Combustion Science, 1993, vol. 19, pp. 145-185.

Lissianski et al., "Effect of Coal Blending on Mercury Removal," presented at the Low Rank Fuels Conference, Billings, MT, Jun. 24-26, 2003, pp. 1-9.

Livengood et al., "Development of Mercury Control Techniques for Utility Boilers," for Presentation at the 88th Air & Waste Management Association Annual Meeting & Exhibit, Jun. 18-23, 1995, pp. 1-14.

Livengood et al., "Enhanced Control of Mercury Emissions Through Modified Speciation," for Presentation at the Air & Waste Management Association's 90th Meeting & Exhibition, Jun. 8-13, 1997, 14 pages.

Livengood et al., "Investigation of Modified Speciation for Enhanced Control of Mercury," Argonne National Laboratory, 1998, available at http://www.netl.doe.gov/publications/proceedings/97/97ps/ps_pdf/PS2B-9.pdf, pp. 1-15.

Luijk et al., "The Role of Bromine in the De Novo Synthesis in a Model Fly Ash System," Chemosphere, 1994, vol. 28, No. 7, pp. 1299-1309.

Martel, K., "Brennstoff-und lastspezifische Untersuchungen zum Verhalten von Schwermetallen in Kohlenstaubfeuerungen [Fuel and load specific studies on the behavior of heavy metals in coal firing systems]," Fortschritt-Berichte VDI, Apr. 2000, pp. 1-240.

McCoy et al., "Full-Scale Mercury Sorbent Injection Testing at DTE Energy's St. Clair Station," Paper #97, DTE Energy, as early as 2004, pp. 1-9.

McCoy, "Urea's Unlikely Role: Emissions Reduction is new application for chemical best known as a fertilizer," Chemical and Engineering News, Jun. 6, 2011, vol. 89, No. 23, p. 32.

Meij et al., "The Fate and Behavior of Mercury in Coal-Fired Power Plants," J. Air & Waste Manage. Assoc., Aug. 2002, vol. 52, pp. 912-917.

Metals Handbook, 9th Edition, Corrosion, vol. 13, ASM International, 1987, pp. 997-998, 6 pages.

Mills Jr., "Techline: Meeting Mercury Standards," as early as Jun. 18, 2001, available at http://www.netl.doe/publications/press/2001/tl_mercuryel2.html, printed on Feb. 5, 2002, pp. 1-3.

Moberg et al., "Migration of Trace Elements During Flue Gas Desulfurization," Report No. KHM-TR-28, Jun. 1982 (abstract only).

Niksa et al., "Predicting Mercury Speciation in Coal-Derived Flue Gases," presented at the 2003 Combined Power Plant Air Pollutant Control Mega Symposium, Washington, D.C., May 2003, pp. 1-14.

Oberacker et al., "Incinerating the Pesticide Ethylene Dibromide (EDB)—A field-Scale Trail Burn Evaluation of Environmental Performance," Report EPA /600/D-88/198, Oct. 1988, pp. 1-11.

Olson et al., "An Improved Model for Flue Gas-Mercury Interactions on Activated Carbons," presented at Mega Symposium May 21, 2003, Energy & Environmental Research Center publication, Paper # 142, pp. 1-8.

Olson et al., "Oxidation Kinetics and the Model for Mercury Capture on Carbon in Flue Gas," presented at Air Quality V Conference, Sep. 21, 2005, pp. 1-7.

Oppenheimer et al., "Thermische Entsorgung von Produktionsabfällen," Entsorgungs-Praxis, 2000, vol. 6, pp. 29-33.

Pasic et al., "Membrane Electrostatic Precipitation, Center for Advanced Materials Processing," Ohio Coal Research Center Department of Mechanical Engineering, Ohio University, on or before 2001, pp. 1-Bayless to10-Bayless.

Paulik et al., "Examination of the Decomposition of CaBr2 with the Method of Simultaneous TG, DTG, DTA and EGA," Journal of Thermal Analysis, vol. 15, 1979, 4 pages.

Pavlish et al., "Status Review of Mercury Control Options for Coal-Fired Power Plants," Fuel Processing Technology, Aug. 2003, vol. 82, pp. 89-165.

Richardson et al., "Chemical Addition for Mercury Control in Flue Gas Derived from Western Coals," presented at the 2003 Combined Power Plant Air Pollutant Control Mega Symposium, Washington D.C., May 2003, Paper # 63, pp. 1-16.

Rodriguez et al., "Iodine Room Temperature Sorbents for Mercury Capture in Combustion Exhausts," 2001, 14 pages.

Samaras et al., "PCDD/F Prevention by Novel Inhibitors: Addition of Inorganic S- and N-Compounds in the Fuel before Combustion," Environmental Science and Technology, 2000, vol. 34, No. 24, pp. 5092-5096.

(56) References Cited

OTHER PUBLICATIONS

Sarkar et al., "Adsorption of Mercury(II) by Kaolinite," Soil Science Society of America Journal, 1999, vol. 64(6), pp. 1968-1975, abstract only, 1 page.
Schmidt et al., "Innovative Feedback Control System for Chemical Dosing to Control Treatment Plant Odors," Proceedings of the Water Environment Federation, WEFTEC 2000: Session 11-Session 20, pp. 166-175 (Abstract), 2 pages.
Schüetze et al., "Redox potential and co-removal of mercury in wet FGD scrubbers," Air Quality VIII Conference, Crystal City, VA, Oct. 24-27, 2011, 1 page.
Schüetze et al., "Strategies for enhanced co-removal of mercury in wet FGD-scrubbers—process control and additives," Flue Gas Cleaning, Helsinki, Finland, May 26, 2011, 25 pages.
Senior et al., "Gas-Phase Transformations of Mercury in Coal-Fired Power Plants," Fuel Processing Technology, vol. 63, 2000, pp. 197-213.
Senior, "Behavior of Mercury in Air Pollution Control Devices on Coal-Fired Utility Boilers," Power Production in the 21st Century: Impacts of Fuel Quality and Operations, Engineering Foundation Conference, Snowbird, UT, Oct 28-Nov. 2, 2001, 17 pages.
Serre et al., "Evaluation of the Impact of Chlorine on Mercury Oxidation in a Pilot-Scale Coal Combustor—the Effect of Coal Blending," U.S. Environmental Protection Agency, Sep. 2009, 21 pages.
Sjostrom et al., "Full-Scale Evaluation of Mercury Control at Great River Energy's Stanton Generating Station Using Injected Sorbents and a Spray Dryer/Baghouse," to be presented at Air Quality III Conference, Session A3b, 2002, 14 pages.
Sjostrom et al., "Full-Scale Evaluation of Mercury Control by Injecting Activated Carbon Upstream of a Spray Dryer and Fabric Filter," Presented at the 2004 combined power plant air pollutant control mega symposium, Washington, D.C., Aug. 2004, 18 pages.
Sjostrom et al., "Long-Term Carbon Injection Field Test for > 90% Mercury Removal for a PRB Unit with a Spray Dryer and Fabric Filter," ADA-ES, Inc. Final Scientific/Technical Report, Apr. 2009, 82 pages.
Sjostrom, "Evaluation of Sorbent Injection for Mercury Control," ADA-ES, Inc. Topical Report for Basin Electric Power Cooperative's Laramie River Station, Jan. 16, 2006, 49 pages.
Sjostrom, "Evaluation of Sorbent Injection for Mercury Control," Topical Report for Sunflower Electric's Holcomb Station, U.S. DOE Cooperative Agreement No. DE-FC26-03NT41986, Topical Report No. 41986R07, Jun. 28, 2005, 85 pages.
Sliger et al., "Towards the Development of a Chemical Kinetic Model for the Homogeneous Oxidation of Mercury by Chlorine Species," Fuel Processing Technology, vol. 65-66, 2000, pp. 423-438.
Speight, ed., The Chemistry and Technology of Coal, CRC Press, 1994, pp. 152-155.
Starns et al., "Full-Scale Evaluation of TOXECON II™ on a Lignite-Fired Boiler" presented at US EPA/DOE/EPRI Combiner Power Plant Air Pollutant Control Symposium: The Mega Symposium, Washington, DC, Aug. 30-Sep. 2, 2004, 14 pages.
Sudhoff, "Anticipated Benefits of the TOXECON Retrofit for Mercury and Multi-Pollutant Control Technology," National Energy Technology Laboratory, Nov. 19, 2003, available at http://www.netl.doe.gov/technologies/coalpower/cctc/pubs/Benefits_TOXECON_111903.pdf, pp. 1-20.
Teller et al., "Mercury Removal from Incineration Flue Gas," Air and Water Technologies Co., for presentation at the 84th Annual Meeting & Exhibition Vancouver, British Columbia, Jun. 16-21, 1991, 10 pages.
United States Environmental Protection Agency, "Study of Hazardous Air Pollutant Emissions from Electric Utility Steam Generating Units," Report to Congress, vol. 1-2, EPA-453/R-98-004a&b, Feb. 1998, pp. 1-165.
Urabe et al., "Experimental Studies on Hg Vapor Removal Using Corona Discharge for Refuse Incinerator," Chemical Abstracts, Oct. 1997, vol. 109, 37 pages (includes translation).
Urano, S., "Studies on Bleaching Powder, VII. The Decomposition of Calcium Hypochlorite by Heat in the Presence of Calcium Chloride," Journal of the Society of Chemical Industry of Japan, vol. 31, 1928, pp. 46-52 (no translation).
Verhulst et al., "Thermodynamic Behavior of Metal Chlorides and Sulfates under the Conditions of Incineration Furnaces," Environmental Science & Technology, 1996, vol. 30, No. 1, pp. 50-56.
Vidic et al., "Uptake of Elemental Mercury Vapors by Activated Carbons," Journal of the Air & Waste Management Association, 1996, vol. 46, pp. 241-250.
Vidic et al., "Vapor-phase elemental mercury adsorption by activated carbon impregnated with chloride and cheltinq agents," Carbon, 2001, vol. 39, pp. 3-14.
Vosteen et al., Mercury Sorption and Mercury Oxidation by Chlorine and Bromine at SCR DeNOx Catalyst (Part A: Oxidation), 9th Annual EPA, DOE, EPRI, EEI Conference on Clean Air, Mercy Global Warming & Renewable Energy, Tucson, AZ, Jan. 24, 2005, 38 pages.
Vosteen et al, "Mercury-Related Chemistry in Waste Incineration and Power Generation Flue Gases," Sep. 2003, Air Quality IV, pp. 1-8.
Vosteen et al., "Bromine Enhanced Mercury Abatement from Combustion Flue Gases—Recent Industrial Applications and Laboratory Research," VGB PowerTech, International Journal for Electricity and Heat Generation, 2006, vol. 86, No. 3, pp. 70-75.
Vosteen et al., "Bromine Enhanced Mercury Abatement from Combustion Flue Gases—Recent Industrial Applications and Laboratory Research," VGB PowerTech, 2nd International Experts' Workshop on Mercury Emissions from Coal (MEC2), May 24 & 25, 2005, 8 pages.
Weber et al., "The Role of Copper(II) Chloride in the Formation of Organic Chlorine in Fly Ash," Chemosphere, 2001, vol. 42, pp. 479-582.
White et al., "Field Test of Carbon Injection for Mercury Control at Camden County Municipal Waste Combustor," EPA-600/R-93-181 (NTIS PB94-101540), Sep. 1993, pp. 1-11.
Withum et al., "Characterization of Coal Combustion By-Products for the Re-Evolution of Mercury into Ecosystems," Consol Energy Inc., Research and Development, Mar. 2005, 48 pages.
Working project report for period Oct. 1, 1999 to Sep. 30, 2001 from Institut fur Verhrenstechnik and Dampfkesselwessen (IVD), Universitat Stuttgart, dated Mar. 28, 2002, pp. 14-38.
Zevenhoven et al., "Control of Pollutants in flue gases and fuel gases," Trace Elements, Alkali Metals, 2001, 32 pages.
Zygarlicke et al., "Flue gas interactions of mercury, chlorine, and ash during coal combustion," Proceedings of the 23rd International Technical Conference on Coal Utilization and Fuel Systems, Clearwater, Florida, Mar. 9-13, 1998, pp. 517-526 (ISBN 0-03206602302).
Official Action for Canadian Patent Application No. 2788820, dated Nov. 29, 2017, 3 pages.
Notice of Allowance for Canadian Patent Application No. 2788820, dated Feb. 4, 2018, 1 page.
Protest for Canadian Patent Application No. 2788820, dated Feb. 26, 2018, 6 pages.
Notice of Protest for Canadian Application No. 2788820, dated Mar. 7, 2018, 1 page.
Confirmation of Notice of Protest for Canadian Application No. 2788820, dated Mar. 7, 2018, 1 page.
Protest for Canadian Application No. 2788820, dated Nov. 6, 2018, 10 pages.
Notice of Protest for Canadian Patent Application No. 2788820, dated Nov. 26, 2018, 1 page.
Confirmation of Notice of Protest for Canadian Application No. 2788820, dated Nov. 26, 2018, 1 page.
Notice of Protest for Canadian Application No. 2793326, dated Feb. 3, 2017, 16 pages.
Notice of Protest for Canadian Application No. 2793326, dated Jul. 7, 2017, 6 pages.
Notice of Protest for Canadian Application No. 2793326, dated Apr. 19, 2018, 17 pages.
Notice of Withdrawal of Notice of Allowance for Canadian Application No. 2793326, dated Apr. 30, 2018, 1 page.

(56) References Cited

OTHER PUBLICATIONS

Official Action for U.S. Appl. No. 16/503,239, dated Jan. 13, 2020 9 pages.
Official Action for U.S. Appl. No. 13/861,162, dated Mar. 6, 2014 10 pages.
Notice of Allowance for U.S. Appl. No. 13/861,162, dated Jul. 7, 2014.
Official Action for U.S. Appl. No. 14/512,142, dated Oct. 15, 2015, 10 pages.
Notice of Allowance for U.S. Appl. No. 14/512,142, dated Mar. 28, 2016, 8 pages.
Official Action for U.S. Appl. No. 15/217,749 dated Jun. 12, 2017, 9 pages.
Notice of Allowance for U.S. Appl. No. 15/217,749 dated Sep. 21, 2017, 7 pages.
Official Action for U.S. Appl. No. 15/694,536 dated Apr. 2, 2018, 7 pages.
Notice of Allowance for U.S. Appl. No. 15/694,536 dated Aug. 6, 2018, 5 pages.
Official Action for U.S. Appl. No. 16/188,758, dated Sep. 13, 2019, 7 pages.
Notice of Allowance for U.S. Appl. No. 16/188,758, dated Dec. 31, 2019, 5 pages.
Final Action for U.S. Appl. No. 15/941,522, dated Jan. 9, 2020 14 pages.
Haiwen, "Basic Science Series of Database of Excellent Master's Degree Theses in China," No. 07, Geochemistry of Iodine in Chinese Coal, Jul. 2008, pp. 29-32, 8 pages.
Matai et al., "Iodine Deficiency Disease-Local Goiter and Local Cretinism," 2nd Edition, People's Medical Publishing House, Jun. 1993, pp. 46-49, 9 pages.
U.S. Appl. No. 17/068,579, filed Oct. 12, 2020, Sjostrom et al.
"Integrating Flue Gas Conditioning with More Effective Mercury Control," Power Engineering, Jun. 17, 2014, retrieved from www.power-eng.com/articles/print/volume-118/issue-6/features/integrating-flue-gas-conditioning-with-more-effective-mercury-control, 9 pages.
Dillon et al., "Preparing for New Multi-Pollutant Regulations with Multiple Low Capital Approaches," Paper #2012-A-131-Mega, AWMA, MEGA 2012 conference, retrieved from http://www.cleancoalsolutions.com/library-resources/preparing-for-new-multi-pollutant-regulations-with-multiple-low-capital-approaches/, 20 pages.
Staudt et al., "Control Technologies to Reduce Conventional and Hazardous Air Pollutants from Coal-Fired Power Plants," prepared for Northeast States for Coordinated Air Use Management (NESCAUM), Mar. 31, 2011, retrieved from www.nescaum.org/.../coal-control-technology-nescaum-report-20110330.pdf, 36 pages.

\* cited by examiner

CONTROL OF WET SCRUBBER OXIDATION INHIBITOR AND BYPRODUCT RECOVERY

CROSS REFERENCE TO RELATED APPLICATION

The present application is a continuation of U.S. patent application Ser. No. 16/188,758 filed Nov. 13, 2018 which is a continuation of U.S. patent application Ser. No. 15/694,536, filed Sep. 1, 2017, now U.S. Pat. No. 10,159,931, with an issue date of Dec. 25, 2018, which is a continuation of U.S. patent application Ser. No. 15/217,749, filed Jul. 22, 2016, now U.S. Pat. No. 9,889,405, with an issue date of Feb. 13, 2018, which is a continuation of U.S. patent application Ser. No. 14/512,142, filed Oct. 10, 2014, now U.S. Pat. No. 9,409,123, with an issued date of Aug. 9, 2016, which is a continuation of U.S. patent application Ser. No. 13/861,162, filed Apr. 11, 2013, now U.S. Pat. No. 8,883,099 with an issued date of Nov. 11, 2014, which claims the benefits of U.S. Provisional Application Ser. No. 61/622,728, filed Apr. 11, 2012, all having the same title, each of which is incorporated herein by this reference in its entirety.

FIELD

The disclosure relates generally to mercury removal from waste gas and particularly to halogen-assisted mercury removal from waste gas.

BACKGROUND

Plants that have a majority of elemental mercury emissions in the discharge flue gas (or waste gas) may utilize halogen additives to control mercury emissions. One primary effect of a halogen additive is to promote oxidized mercury species ($Hg^{++}$) in the flue gas. Mercury emissions are generally reduced by two mechanisms: (a) adsorption of mercury ($Hg^{++}$ in particular) on particles or particulates in the flue gas and subsequent removal by the particulate control device; and/or (b) absorption of $Hg^{++}$ in a flue-gas desulfurization ("FGD") scrubber. Among halogens, bromine and bromide additives and brominated sorbents are widely employed for mercury control from coal-fired sources. However, there are serious emerging problems associated with the use of high concentration bromide additives and sorbents. Applied as coal additives, iodine and iodide salts are an alternative to bromine.

There is a need to optimize performance and reduce operating costs of iodine additives for mercury control for plants with wet FGD scrubbers. Iodine or iodide compounds are often added onto the coal feed at a rate of about 1 to 30 $ppm_w$ of coal feed. Iodine is a relatively expensive compared to bromine, but is about 10 times more efficient as a mercury oxidizer. Compared to bromine and bromide additives, iodine and iodide salts can have fewer detrimental side effects, such as metal corrosion, and has less potential to create emissions of stratospheric ozone-destroying precursors (due in part to its use at much lower concentrations).

There is also a need to control iodine buildup in flue gas treatment processes, even where iodine and/or iodide salts are not added. Many coals used in utility plants have higher native iodine concentrations (>3 $ppm_w$). The majority of North American coals and lignites (for which there is measured iodine data) have low iodine concentration (<1 $ppm_w$). However, iodine is not comprehensively monitored in North American coals. Iodine is known to accumulate in certain coal formations such as marine roof coals and in select coals associated with volcanic activity.

Native iodine in the coal and/or iodine added to the coal feed is believed to first form hydroiodic acid (HI) as it cools after combustion. Further reactions convert a portion of this to molecular $I_2$ gas. Iodide in flue gas as hydroiodic acid is water soluble and will be retained in the scrubber slurry. Iodine is less soluble in solution, but solubility is increased in a mixed iodide/iodine solution. In solution, the molecular iodine reacts reversibly with the negative $I^-$ ion, generating the $I_3^-$ anion, which is soluble in water.

An excess of iodine dissolved in scrubber solution can not only be volatilized during upset conditions, leading to a characteristic "purple plume" stack emission but also interfere with acid gas removal. Iodine is an oxidation inhibitor. High concentrations of iodide/iodine in the scrubbing solution moderate the sulfite oxidation rate and suppress the oxidation reduction potential (ORP). Iodide is able to reduce either the sulfite or the peroxomonosulfate radicals or the catalytically active transition-metal ions and is thereby oxidized to iodine. It can subsequently be reduced to iodide again by excess sulfite. Therefore, iodine is able to inhibit the overall $SO_2$ to sulfating reaction(s) and is not consumed in the process.

SUMMARY

These and other needs are addressed by the various aspects, embodiments, and configurations of the present disclosure. The present disclose is directed generally to controlling iodine and/or iodide levels in web scrubbers.

A method, according to the present disclosure, can include the steps of:

(a) receiving a waste gas comprising an acid gas and elemental iodine and/or an iodine-containing composition;

(b) passing the waste gas through a wet scrubber to remove, from the waste gas, at least a portion of the acid gas and the elemental iodine and/or iodine-containing composition and form a scrubbing solution comprising an acid derived from the acid gas and/or a derivative thereof and the elemental iodine and/or iodine-containing composition; and (c) removing, from the scrubbing solution, at least a portion of the elemental iodine and/or iodine-containing composition, thereby reducing a concentration of the elemental iodine and/or iodine-containing composition in the scrubbing solution.

Another method, according to this disclosure, can include the steps of:

(a) receiving a waste gas comprising an acid gas and elemental mercury;

(b) contacting an iodine-containing additive with the waste gas upstream of a wet scrubber to oxidize elemental mercury in the waste gas to a non-elemental mercury (c) passing the waste gas through a wet scrubber to remove at least a portion of the acid gas and elemental iodine/or an iodine-containing composition derived from the iodine-containing additive and form a scrubbing solution comprising an acid and/or salt derived from the acid gas and the elemental iodine and iodine-containing composition; and (d) removing, from the scrubbing solution, at least a portion of the elemental iodine and/or iodine-containing composition, thereby reducing a concentration of the elemental iodine and/or iodine-containing composition in the scrubbing solution.

Another method, according to the disclosure, can include the steps of:

(a) receiving a waste gas comprising elemental iodine and/or an iodine-containing composition;

(b) passing the waste gas through a wet scrubber to remove the elemental iodine and/or iodine-containing composition from the waste gas and form a scrubbing solution comprising the elemental iodine and/or an iodine-containing composition; and (c) removing, from the scrubbing solution, at least a portion of the elemental iodine and/or iodine-containing composition by one or more of ion exchange, absorption, adsorption, precipitation, filtration, solvent extraction, ion pair extraction, and aqueous two-phase extraction, thereby reducing a concentration of the elemental iodine and/or iodine-containing composition in the scrubbing solution.

When the waste gas includes elemental mercury, the method can include the step of contacting an iodine-containing additive with the waste gas upstream of the wet scrubber to oxidize elemental mercury in the waste gas to a non-elemental mercury.

The elemental iodine and/or iodine-containing composition can be removed from the scrubbing solution by a carbonaceous material. The elemental iodine and/or iodine-containing composition can be sorbed on the carbonaceous material. The method can further include the steps of:

recovering the carbonaceous material from the scrubbing solution; and introducing the recovered carbonaceous material to the waste gas as the iodine-containing additive.

Iodine or iodide compounds are commonly added onto the coal feed at a rate of about 1 to 30 $ppm_w$ of coal feed.

In some applications, the method can include the further steps of:

contacting an iodine-containing additive with a mercury-containing feed material, the waste gas being derived from the mercury-containing feed material;

recovering the carbonaceous material from the scrubbing solution; and introducing the recovered carbonaceous material to the waste gas as the iodine-containing additive.

The removing step can include passing at least a portion of the scrubbing solution through a carbonaceous material to collect onto the carbonaceous material the elemental iodine and/or iodine-containing composition.

After the removing step, the scrubbing solution can be returned to the wet scrubber, particularly when the wet scrubber is a flue-gas desulfurization scrubber.

In some applications, the flow of the scrubbing solution through the carbonaceous material is controlled at a rate to maintain overall iodine concentration in the scrubber solution at less than about 100 ppm.

In some applications, the flow of an input scrubbing solution through a first bed of the carbonaceous material is stopped automatically by a microprocessor when a concentration of iodine and/or iodine-containing composition in an output scrubbing solution is at least a predetermined threshold and/or a difference between concentrations of the at least one of iodine and iodine-containing composition in the input and output scrubbing solutions is at least a predetermined threshold. The flow of the scrubbing solution through a second bed of the carbonaceous material can be initiated automatically by the microprocessor in response to an absolute value of the concentration of the iodine and iodine-containing composition in the output scrubbing solution reaching the at least a predetermined threshold.

The carbonaceous material can be introduced into the waste gas at an inlet to the wet scrubber or into a reservoir of the scrubbing solution in the wet scrubber. For example, activated carbon or carbonaceous sorbent can be introduced as a powdered sorbent upstream of the wet FGD scrubber or into the recycle loop or in the form of a granular packed bed treatment in the recycle loop.

The scrubbing solution can be contacted with an oxidizing agent and/or pH-adjusted to convert elemental mercury in the scrubbing solution and/or on the carbonaceous material to a more water soluble form of mercury and convert iodide to elemental iodine for collection by the carbonaceous material.

By way of example, iodine concentration in flue-gas desulfurization ("FGD") scrubbing (slurry) solutions can be controlled by selective sorption of iodine ($I_2$) on suspended carbonaceous sorbents, such as activated carbon. Soluble iodide ($I^-$) in the slurry may be oxidized to iodine to remove a portion of the iodine during normal scrubber operations including forced oxidation or via a separate oxidation step of the scrubber wastewater treatment stream.

To enhance elemental mercury oxidation, the method can include one or more of the following steps upstream of the wet scrubber:

(i) contacting the waste gas with at least one of a halogen and a halogen-containing composition;

(ii) contacting the waste gas with a selective catalytic reduction catalyst; and (iii) contacting the waste gas with a carbonaceous material in a baghouse.

In the third option, the carbonaceous material can be introduced into the waste gas at or near an inlet of the baghouse. Mercury oxidation rate at the FGD inlet may be increased by flue gas transit through fabric filter baghouse with select fabrics, ash cake characteristics, and sorbent and catalytic oxidizers optionally added.

The various methods can apply, control, recycle, and/or recover iodine to enhance mercury recovery and maintain $SO_2$ removal efficiency, particularly in wet flue gas desulfurization (FGD) scrubbers on coal-fired power plants. Microporous carbonaceous sorbents, such as activated carbon, can be excellent selective sorbents for elemental iodine (but typically not of iodide). Sorbed iodine on the carbon surface can increase chemisorption of mercury on the carbon surface, increase overall removal of mercury and prevent re-emission of mercury from the scrubber. Controlling buildup of iodide and iodine species in scrubber solution in wet FGD scrubbers can maintain oxidation efficiency of wet FGD scrubbers. Carbonaceous materials enriched in iodine can be separated from the scrubbing slurry effectively, further treated to remove mercury and recharged to the coal feed. Alternatively the recovered carbonaceous material can be landfilled and/or the iodine may be recovered for commercial sale, particularly for plants that fire high iodide coals or that use iodine coal additives for mercury control.

The present disclosure can provide a number of other advantages depending on the particular configuration. This disclosure can provide a means to supplementally control iodide buildup and, optionally, to reduce the amount of halogen coal additive required by recycling a portion of the slurry iodide back to the coal feed. It can substantially optimize performance and reduce operating costs of iodine additives for mercury control for plants with wet FGD scrubbers. Although iodine is relatively expensive compared to bromine, it is about 10 times more efficient than other halogens, particularly bromine, as a mercury oxidizer. It can have fewer detrimental side effects such as metal corrosion and less potential to create emissions of stratospheric ozone-destroying precursors (due in part to iodine's use at much lower concentrations). The disclosure can also be useful for plants that fire coals or other bio-mass with higher native iodine concentrations (>3 $ppm_w$). The majority of North American coals and lignites for which there is measured iodine data have low iodine concentration (<1 $ppm_w$). Iodine is known to accumulate in certain coal formations such as marine roof coals and in select coals associated with volcanic activity. For plants with a fabric filter followed by a wet scrubber, mercury oxidation across the fabric filter can be enhanced by control of various operating parameters to maximize mercury capture in the scrubber.

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Absorption" is the incorporation of a substance in one state into another of a different state (e.g. liquids being absorbed by a solid or gases being absorbed by a liquid). Absorption is a physical or chemical phenomenon or a process in which atoms, molecules, or ions enter some bulk phase—gas, liquid or solid material. This is a different process from adsorption, since molecules undergoing absorption are taken up by the volume, not by the surface (as in the case for adsorption).

"Adsorption" is the adhesion of atoms, ions, biomolecules, or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. Similar to surface tension, adsorption is generally a consequence of surface energy. The exact nature of the bonding depends on the details of the species involved, but the adsorption process is generally classified as physisorption (characteristic of weak van der Waals forces)) or chemisorption (characteristic of covalent bonding). It may also occur due to electrostatic attraction.

"Acid gas" refers to any type of gas or gaseous mixture which forms an acidic compound when mixed with water. The most common types of acid gases are hydrogen sulfide ($H_2S$), sulfur oxides ($SO_x$) (which can form sulfuric acid when mixed with water), nitric oxides ($NO_x$) (which can form nitric acid when mixed with water), and carbon monoxide (CO) and/or carbon dioxide ($CO_2$) (which can form carbonic acid when mixed with water).

"Ash" refers to the residue remaining after complete combustion of the coal particles. Ash typically includes mineral matter (silica, alumina, iron oxide, etc.).

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

"Biomass" refers to biological matter from living or recently living organisms. Examples of biomass include, without limitation, wood, waste, (hydrogen) gas, seaweed, algae, and alcohol fuels. Biomass can be plant matter grown to generate electricity or heat. Biomass also includes, without limitation, plant or animal matter used for production of fibers or chemicals. Biomass further includes, without limitation, biodegradable wastes that can be burnt as fuel but generally excludes organic materials, such as fossil fuels, which have been transformed by geologic processes into substances such as coal or petroleum. Industrial biomass can be grown from numerous types of plants, including miscanthus, switchgrass, hemp, corn, poplar, willow, sorghum, sugarcane, and a variety of tree species, ranging from eucalyptus to oil palm (or palm oil).

"Carbonaceous" refers to a carbon-containing material, particularly a material that is substantially rich in carbon.

"Coal" refers to a combustible material formed from prehistoric plant life. Coal includes, without limitation, peat, lignite, sub-bituminous coal, bituminous coal, steam coal, anthracite, and graphite. Chemically, coal is a macromolecular network comprised of groups of polynuclear aromatic rings, to which are attached subordinate rings connected by oxygen, sulfur, and aliphatic bridges.

A "composition" refers to one or more chemical units composed of one or more atoms, such as a molecule, polyatomic ion, chemical compound, coordination complex, coordination compound, and the like. As will be appreciated, a composition can be held together by various types of bonds and/or forces, such as covalent bonds, metallic bonds, coordination bonds, ionic bonds, hydrogen bonds, electrostatic forces (e.g., van der Waal's forces and London's forces), and the like.

"Flue-gas desulfurization" or "FGD" refers to a set of technologies to remove gas-phase sulfur dioxide ($SO_2$), particularly from exhaust flue gases of fossil-fuel power plants and from the emissions of other sulfur oxide emitting processes.

"Halogen" refers to an electronegative element of group VIIA of the periodic table (e.g., fluorine, chlorine, bromine, iodine, astatine, listed in order of their activity with fluorine being the most active of all chemical elements).

"Halide" refers to a binary compound of the halogens.

"High alkali coals" refer to coals having a total alkali (e.g., calcium) content of at least about 20 wt. % (dry basis of the ash), typically expressed as CaO, while "low alkali coals" refer to coals having a total alkali content of less than 20 wt. % and more typically less than about 15 wt. % alkali (dry basis of the ash), typically expressed as CaO.

"High iron coals" refer to coals having a total iron content of at least about 10 wt. % (dry basis of the ash), typically expressed as $Fe_2O_3$, while "low iron coals" refer to coals having a total iron content of less than about 10 wt. % (dry basis of the ash), typically expressed as $Fe_2O_3$. As will be appreciated, iron and sulfur are typically present in coal in the form of ferrous or ferric carbonates and/or sulfides, such as iron pyrite.

"High sulfur coals" refer to coals having a total sulfur content of at least about 1.5 wt. % (dry basis of the coal) while "medium sulfur coals" refer to coals having between about 1.5 and 3 wt. % (dry basis of the coal) and "low sulfur coals" refer to coals typically having a total sulfur content of less than about 1.5 wt. % (dry basis of the coal), more typically having a total sulfur content of less than about 1.0 wt. %, and even more typically having a total sulfur content of less than about 0.8 wt. % of the coal (dry basis of the coal).

"Iodine number" is used to characterize activated carbon performance. It is a measure of activity level (higher number indicates higher degree of activation), often reported in mg/g (typical range 500-1200 mg/g). It is a measure of the micropore content of the activated carbon (0 to 20 Å, or up to 2 nm) by adsorption of iodine from solution. It is equivalent to surface area of carbon between 900 m$^2$/g and 1100 m$^2$/g. Iodine number is defined as the milligrams of iodine adsorbed by one gram of carbon when the iodine concentration in the residual filtrate is 0.02 normal. Basically, iodine number is a measure of the iodine adsorbed in the pores and, as such, is an indication of the pore volume available in the activated carbon of interest.

"Ion exchange medium" refers to a medium that is able, under selected operating conditions, to exchange ions between two electrolytes or between an electrolyte solution and a complex. Examples of ion exchange resins include solid polymeric or mineralic "ion exchangers". Other exemplary ion exchangers include ion exchange resins (functionalized porous or gel polymers), zeolites, montmorillonite clay, clay, and soil humus. Ion exchangers are commonly either cation exchangers that exchange positively charged ions (cations) or anion exchangers that exchange negatively charged ions (anions). There are also amphoteric exchangers that are able to exchange both cations and anions simultaneously. Ion exchangers can be unselective or have binding preferences for certain ions or classes of ions, depending on their chemical structure. This can be dependent on the size of the ions, their charge, or their structure. Typical examples of ions that can bind to ion exchangers are: $H^+$ (proton) and $OW$ (hydroxide); single-charged monoatomic ions like $Na^+$, $K^+$, and $Cl^-$; double-charged monoatomic ions like $Ca^{2+}$ and $Mg^{2+}$; polyatomic inorganic ions like $SO_4^{2-}$ and $PO_4^{3-}$; organic bases, usually molecules containing the amino functional group $—NR_2H^+$; organic acids often molecules containing $—COO^-$ (carboxylic acid) functional groups; and biomolecules that can be ionized: amino acids, peptides, proteins, etc.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Neutron Activation Analysis ("NAA") refers to a method for determining the elemental content of samples by irradiating the sample with neutrons, which create radioactive forms of the elements in the sample. Quantitative determination is achieved by observing the gamma rays emitted from these isotopes.

"Oxidizing agent", "oxidant" or "oxidizer" refers to an element or compound that accepts one or more electrons to another species or agent that is oxidized. In the oxidizing process the oxidizing agent is reduced and the other species which accepts the one or more electrons is oxidized. More specifically, the oxidizer is an electron acceptor, or recipient, and the reductant is an electron donor or giver.

"Particulate" refers to fine particles, such as fly ash, unburned carbon, soot and fine process solids, typically entrained in a gas stream.

"pH Adjustor" refers to any material, whether acidic, basic, or alkaline, that adjusts the pH of a solution. Exemplary basic or alkaline materials include alkali and alkaline earth metal hydroxides, carbonates, and ammonia and acidic materials include sulfuric acid, hydrochloric acid, nitric acid, carbonic acid, phosphoric acid, and other mineral acids.

The phrase "ppmw X" refers to the parts-per-million, based on weight, of X alone. It does not include other substances bonded to X.

The phrase "ppmv X" refers to the parts-per-million, based on volume, of X alone. It does not include other substances bonded to X.

"Reducing agent", "reductant" or "reducer" refers to an element or compound that donates one or more electrons to another species or agent this is reduced. In the reducing process the reducing agent is oxidized and the other species which accepts the one or more electrons is oxidized. More specifically, the reducer is an electron donor and the oxidant is an electron acceptor or recipient.

The terms "remove" or "removing" include the sorption, precipitation, adsorption, absorption, conversion, deactivation, decomposition, degradation, neutralization, and/or killing of a target material.

A "scrubber" or "scrubber system" is an air pollution control device that can be used to remove some particulates and/or gases from industrial exhaust streams. Traditionally, the term "scrubber" has referred to a pollution control device to "wash out" acid gases in an exhaust stream, such as a flue gas.

"Separating" and cognates thereof refer to setting apart, keeping apart, sorting, removing from a mixture or combination, or isolating. In the context of gas mixtures, separating can be done by many techniques, including electrostatic precipitators, baghouses, scrubbers, and heat exchange surfaces.

"Soluble" refers to materials that readily dissolve in water. For purposes of this invention, it is anticipated that the dissolution of a soluble compound would necessarily occur on a time scale of minutes rather than days. For the compound to be considered to be soluble, it is necessary that it has a significantly high solubility product such that upwards of 5 g/L of the compound will be stable in solution.

A "sorbent" is a material that sorbs another substance; that is, the material has the capacity or tendency to take it up by sorption.

"Sorb" and cognates thereof mean to take up a liquid or a gas by sorption.

"Sorption" and cognates thereof refer to adsorption and absorption, while desorption is the reverse of adsorption.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Process Overview

The current disclosure is directed to the use of an iodine-containing additive, typically present in relatively low concentrations, and/or natively occurring iodine-containing compounds in feed materials, such as coal, to control mercury emissions from vapor phase mercury evolving facilities, such as smelters, autoclaves, roasters, steel foundries, steel mills, cement kilns, power plants, waste incinerators, boilers, and other mercury-contaminated gas stream producing industrial facilities. Although the mercury is typically evolved by combustion, it may be evolved by other oxidation and/or reducing reactions, such as roasting, autoclaving, and other thermal processes that expose mercury containing materials to elevated temperatures.

The current disclosure is further directed to the application, control, recycle and recovery of iodine to enhance mercury recovery and to maintain $SO_2$ removal efficiency in wet flue gas desulfurization (FGD) scrubbers. Iodide concentration in slurry solution is controlled by oxidation of iodide to iodine in scrubber waste water followed by selective sorption of the generated iodine on suspended carbonaceous sorbents, such as activated carbon or by iodide ion (anion) exchange.

Iodine enriched sorbent may be separated from solution, dewatered and recharged onto the coal feed for combustion if concentration of heavy metals such as mercury and selenium on the sorbent are kept at low levels. A portion of the iodine required for coal treatment can thereby be provided by recycle. Alternatively, iodine can be extracted from the activated carbon for further purification and separation for commercial use.

While not wishing to be bound by any theory, native iodine in the coal or iodine added to the coal feed is believed to first form hydroiodic acid (HI) as it cools after combustion. Further reactions are believed to convert a portion of this to molecular $I_2$ gas. Iodide in flue gas as hydroiodic acid is water soluble and will be retained in the scrubber slurry. Iodine can be less soluble in solution, but solubility can be increased in a mixed iodide/iodine solution. In solution, the molecular iodine reacts reversibly with the negative $I^-$ ion, generating the $I_3^-$ anion, which is soluble in water. An excess of iodine dissolved in scrubber solution can be volatilized during upset conditions, leading to a characteristic "purple plume" stack emission. Maintaining lower iodine and iodide levels in the scrubbing solution can reduce or eliminate entirely such undesirable emissions.

Figure 1:
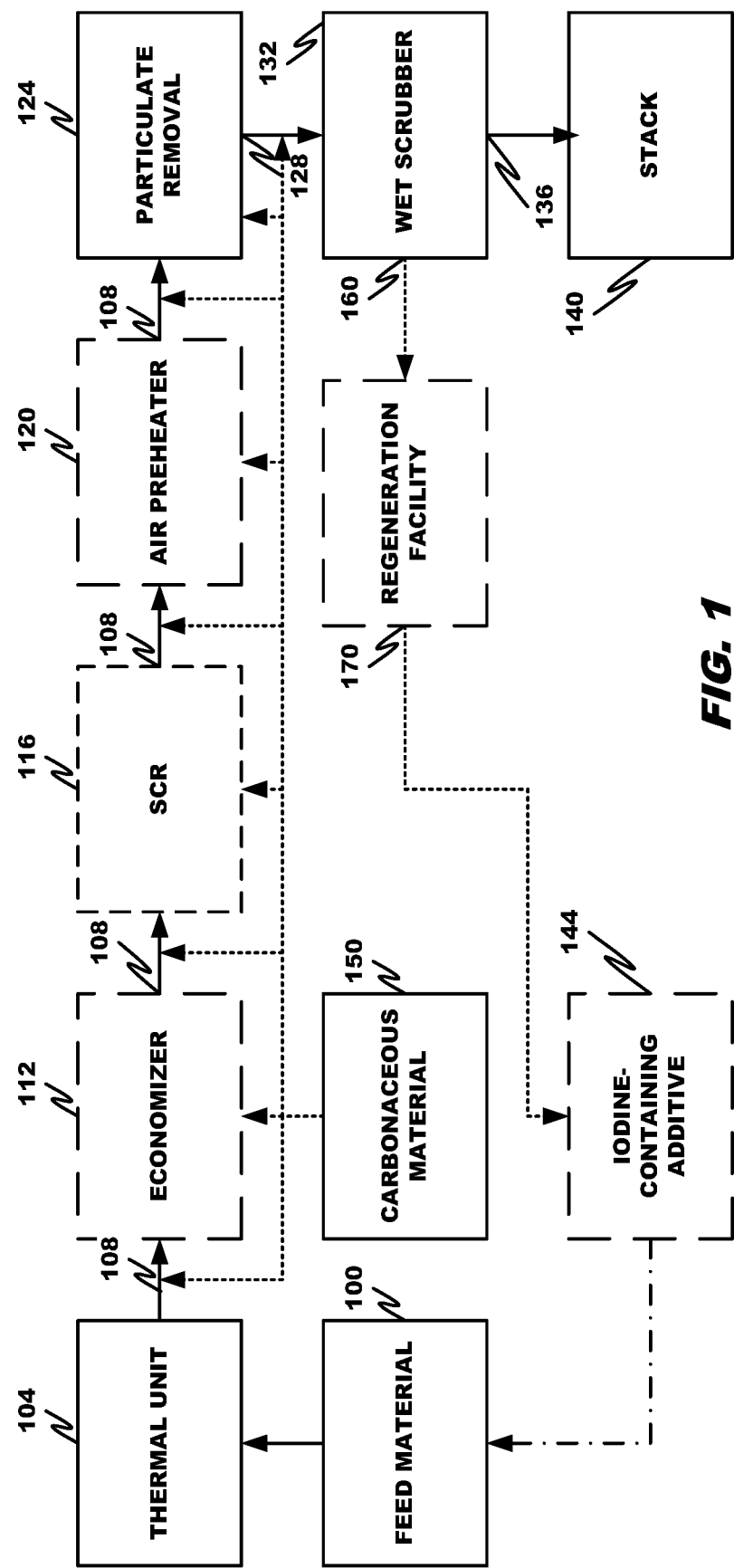
FIG. 1 is a block diagram according to an embodiment.

FIG. 1 depicts a common contaminated gas stream treatment process for an industrial facility. Referring to FIG. 1, a mercury-containing feed material 100 is provided. In one application, the feed material 100 is combustible and can be any synthetic or natural, mercury-containing, combustible, and carbon-containing material, including coal and biomass. The feed material 100 can be a high alkali or high iron coal. In other applications, the present disclosure is applicable to noncombustible, mercury-containing feed materials, including without limitation metal-containing ores, concentrates, and tailings.

The feed material 100 can natively include, without limitation, varying levels of halogens (e.g., iodine, bromine, and chlorine) and mercury. Typically, the feed material 100 includes typically at least about 0.001 ppmw, even more typically from about 0.003 to about 100 ppmw, and even more typically from about 0.003 to about 10 ppmw mercury (both elemental and speciated) (measured by neutron activation analysis ("NAA")). Commonly, a combustible feed material 100 includes no more than about 5 ppmw iodine, more commonly no more than about 4 ppmw iodine, even more commonly no more than about 3 ppmw iodine, even more commonly no more than about 2 ppmw iodine and even more commonly no more than about 1 ppmw iodine (measured by neutron activation analysis ("NAA")). A combustible feed material 100 generally will produce, upon combustion, an unburned carbon ("UBC") content of from about 0.1 to about 30% by weight and even more generally from about 0.5 to about 20% by weight.

The feed material 100 is combusted in thermal unit 104 to produce a mercury-containing gas stream 108. The thermal unit 104 can be any combusting device, including, without limitation, a dry or wet bottom furnace (e.g., a blast furnace, puddling furnace, reverberatory furnace, Bessemer converter, open hearth furnace, basic oxygen furnace, cyclone furnace, stoker boiler, cupola furnace and other types of furnaces), boiler, incinerator (e.g., moving grate, fixed grate, rotary-kiln, or fluidized or fixed bed, incinerators), calciners including multi-hearth, suspension or fluidized bed roasters, intermittent or continuous kiln (e.g., ceramic kiln, intermittent or continuous wood-drying kiln, anagama kiln, bottle kiln, rotary kiln, catenary arch kiln, Feller kiln, noborigama kiln, or top hat kiln), oven, or other heat generation units and reactors.

The mercury-containing gas stream 108 includes not only elemental and/or speciated mercury but also a variety of other materials. A common mercury-containing gas stream 108 includes at least about 0.001 ppmw, even more commonly at least about 0.003 ppmw, and even more commonly from about 0.005 to about 0.02 ppmw mercury (both elemental and speciated). Other materials in the mercury-containing gas stream 108 can include, without limitation, particulates (such as fly ash), sulfur oxides, nitrogen oxides, carbon oxides, unburned carbon, halogens, and other types of particulates.

The temperature of the mercury-containing gas stream 108 varies depending on the type of thermal unit 104 employed. Commonly, the mercury-containing gas stream 108 temperature is at least about 125° C., even more commonly is at least about 325° C., and even more commonly ranges from about 325 to about 500° C.

The mercury-containing gas stream 108 is optionally passed through an economizer 112 and/or a an air preheater 120 to transfer some of the thermal energy of the mercury-containing gas stream 108 to air input to the thermal unit 104. The heat transfer produces a common temperature drop in the mercury-containing gas stream 108 of from about 50 to about 300° C. to produce a mercury-containing gas stream 116 temperature commonly ranging from about 100 to about 400° C.

The mercury-containing gas stream 108 can also optionally be passed through a selective catalytic reduction ("SCR") zone 116. As will be appreciated, SCR converts nitrogen oxides, or $NO_X$, with the aid of a catalyst, into diatomic nitrogen ($N_2$) and water. The SCR can also increase the oxidation of Hg at the wet scrubber inlet (discussed below). A gaseous reductant or reducing agent, typically anhydrous ammonia, aqueous ammonia, or urea (but other gas-phase reductants may be employed), can be injected into a stream of flue or exhaust gas or other type of gas stream or absorbed onto a catalyst followed by off gassing of the ammonia into the gas stream. Suitable catalysts include, without limitation, ceramic materials used as a carrier, such as titanium oxide, and active catalytic components, such as oxides of base metals (such as vanadium ($V_2O_5$), wolfram ($WO_3$), titanium oxide ($TiO_2$) and tungstate (e.g., $WO_4^{2-}$), zeolites, and various precious metals. Other catalysts, however, may be used.

The SCR catalyst surface, depending on the design, catalyst and layering, is active for reactions other than the primary nitrogen oxide reduction. There are competing reactions occurring for available sites to reduce $NO_X$, oxidize $SO_2$ to $SO_3$ and to promote the reaction of mercury with various species to result in an increased fraction of oxidized mercury species. The SCR ammonia rate is co-variable with load and temperature and affects the balance between these competing reactions.

The mercury-containing gas stream 108 is next subjected to particulate removal device 124 to remove most of the particulates from the mercury-containing gas stream and form a treated gas stream 128. The particulate removal device 124 can be any suitable device, including an electrostatic precipitator, particulate filter such as a baghouse, wet particulate scrubber, and other types of particulate removal devices. In one configuration a reverse air or pulsed jet baghouse is employed.

The treated gas stream 128 is next passed through a wet scrubber 132, typically a wet FGD scrubber to remove at least most and more typically at least about 75% of any remaining particulates and acid gases in the treated gas stream 408 to form a further treated gas stream 136. An exemplary scrubber is a limestone forced oxidation LSFO scrubber for $SO_X$, heavy metal and mercury control. As will be appreciated, $SO_2$ is an acid gas and, therefore, the typical sorbent slurries or other materials used to remove the $SO_2$ from waste gases are alkaline. A typical reaction taking place in wet scrubbing using a $CaCO_3$ (limestone) slurry produces $CaSO_3$ (calcium sulfite) and can be expressed as:

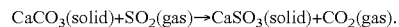

When wet scrubbing with a $Ca(OH)_2$ (lime) slurry, the reaction also produces $CaSO_3$ (calcium sulfite) and can be expressed as:

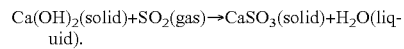

When wet scrubbing with a $Mg(OH)_2$ (magnesium hydroxide) slurry, the reaction produces $MgSO_3$ (magnesium sulfite) and can be expressed as:

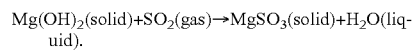

The $CaSO_3$ (calcium sulfite) can be further oxidized to produce marketable $CaSO_4 \cdot 2H_2O$ (gypsum). This technique is also known as forced oxidation:

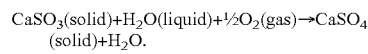

A common wet limestone FGD system removes sulfur dioxide from the flue gas by passing the flue gas through a chamber that exposes the flue gas to a spray slurry of finely ground limestone. The slurry absorbs the $SO_2$ from the flue gas by reaction of the calcium in the limestone with $SO_2$ to form a mixture of calcium sulfite and calcium sulfate. The slurry is pumped through banks of countercurrent spray nozzles, creating fine droplets with uniform contact with the flue gas.

After absorbing the sulfur dioxide from the flue gas, the slurry collects in the bottom of the absorber in a reaction tank. It is aerated via forced oxidation to oxidize bisulfite ion to sulfate. This can avoid formation of calcium sulfite hemihydrates in favor of producing calcium sulfate dihydrate, or gypsum, which precipitates. Oxidized slurry is then recirculated to the spray headers. A portion of the slurry is withdrawn to remove the precipitated gypsum. Typically, the slurry is dewatered in a two-stage process involving a hydroclone and vacuum filter system to produce a gypsum cake for disposal or sale. Water removed from the slurry is returned to the process. A portion of this water is removed from the system as wastewater to limit the accumulation of chloride salts and other undesirable constituents introduced with the coal.

The solid fines are separated from the coarse gypsum solids using a hydroclone. The hydroclone overflow stream is further treated prior to wastewater discharge and return of a portion of the liquid to the slurry reaction tank.

Other scrubbing reagents can be used in the scrubbing solution. As explained above, alkaline sorbents are used for scrubbing flue gases to remove $SO_2$. Other examples of alkaline sorbents include sodium hydroxide (also known as caustic soda). Caustic soda has the advantage that it forms a solution rather than a slurry. It produces a "spent caustic" solution of sodium sulfite/bisulfite (depending on the pH), or sodium sulfate that must be disposed of. It is possible to scrub sulfur dioxide by using a cold solution of sodium sulfite, this forms a sodium hydrogen sulfite solution. By heating this solution it is possible to reverse the reaction to form sulfur dioxide and the sodium sulfite solution. Since the sodium sulfite solution is not consumed, it is called a regenerative treatment. The application of this reaction is also known as the Wellman-Lord process.

The further treated gas stream 136 is emitted, via gas discharge or stack 140, into the environment.

The Iodine-Containing Additive for Mercury Control

To control mercury emissions in the mercury-containing gas stream 108, an iodine-containing additive 144, typically in the form of iodide salts or as iodine or iodate ($IO_3^-$), can be employed. The iodine in the additive 144 can be in the form of a solid, liquid, vapor, or a combination thereof. It can be in the form of an elemental halogen (e.g., iodine ($I_2$)), a halide (e.g., binary halides, oxo halides, hydroxo halides, and other complex halides), an inter-halogen cation or anion, a haloacid (e.g., iodic acid and periodic acid), a halosalt (e.g., a periodate), a homoatomic polyanion, and mixtures thereof. In one formulation, the iodine in the additive 144 is composed primarily of an alkali or alkaline earth metal iodide. In one formulation, the iodine-containing additive 144 is substantially free of other halogens and even more typically contains no more than about 25%, even more typically no more than about 10%, and even more typically no more than about 5% of the halogens as halogen(s) other than iodine. In one formulation, the iodine-containing additive 144 contains at least about 100 ppmw, more commonly at least about 1,000 ppmw, and even more commonly at least about 1 wt. % iodine. In one formulation, the iodine-containing additive contains no more than about 40 wt. % fixed or total carbon, more commonly no more than about 25 wt. % fixed or total carbon, even more commonly no more than about 15 wt. % fixed or total carbon, and even more commonly no more than about 5 wt. % fixed or total carbon. In one formulation, the iodine-containing additive 144 is a high (native) iodine coal. In one formulation, the iodine-containing additive 144 is an iodine-containing waste or byproduct material, such as a medical waste. In one formulation, the iodine-containing additive 144 comprises iodine attached to a solid support, such as by absorption, adsorption, ion exchange, formation of a chemical composition, precipitation, physical entrapment, or other attachment mechanism. The solid support can be inorganic or organic. Examples include ion exchange resins (functionalized porous or gel polymers), soil humus, a porous carbonaceous material, metal oxides (e.g., alumina, silica, silica-alumina, gamma-alumina, activated alumina, acidified alumina, and titania), metal oxides containing labile metal anions (such as aluminum oxychloride), non-oxide refractories (e.g., titanium nitride, silicon nitride, and silicon carbide), diatomaceous earth, mullite, porous polymeric materials, crystalline aluminosilicates such as zeolites (synthetic or naturally occurring), amorphous silica-alumina, minerals and clays (e.g., bentonite, smectite, kaolin, dolomite, montmorillinite, and their derivatives), porous ceramics metal silicate materials and minerals (e.g., one of the phosphate and oxide classes), ferric salts, and fibrous materials (including synthetic (for example, without limitation, polyolefins, polyesters, polyamides, polyacrylates, and combinations thereof) and natural (such as, without limitation, plant-based fibers, animal-based fibers, inorganic-based fibers, cellulosic, cotton, paper, glass and combinations thereof). Commonly, the iodine-containing additive 144 contains no more than about 10 wt. % iodine, more commonly no more than about 5 wt. % iodine, even more commonly no more than about 1 wt. % iodine, even more commonly no more than about 0.5 wt. % iodine, and even more commonly no more than about 0.1 wt. % iodine.

The iodine-containing additive 144 can be contacted with the mercury-containing gas stream 108 at any of a variety of locations, including upstream of the economizer 112, in the economizer 112, at the inlet of the SCR 116, in the SCR 116, at the inlet of the air preheater 120, in the air preheater 120, at the inlet of the particulate removal device 124, and in the particulate removal device 124. It can also be added to the feed material 100 prior to and/or during combustion. For example, the iodine-containing additive 144 can be added directly to the feed material 100 upstream of the thermal unit 104. The coal feed can be treated with a potassium iodide solution or a carbonaceous sorbent enriched in iodine can be added to the coal. Alternatively, the iodine may be injected into the boiler combustion zone or the process off-gas stream. The range of addition is typically about 1 to 30 $ppm_w$ of the coal feed. When introduced into the mercury-containing gas stream 108, the iodine-containing additive 144 is introduced into the gas stream 108, such as by injection as a liquid, vapor, or solid powder. The iodine-containing additive can be dissolved in a liquid, commonly aqueous, in the form of a vapor, in the form of an aerosol, or in the form of a solid or supported on a solid. In one formulation, the iodine-containing additive 144 is introduced as a liquid droplet or aerosol downstream of the thermal unit 104. In this formulation, the iodine is dissolved in a solvent that evaporates, leaving behind solid or liquid particles of the iodine-containing additive 144.

In one plant configuration, sufficient iodine-containing additive 144 is added to produce a gas-phase iodine concentration commonly of about 8 $ppm_w$ basis of the flue gas or less, even more commonly of about 5 $ppm_w$ basis or less, even more commonly of about 3.5 $ppm_w$ basis or less, even more commonly of about 1.5 $ppm_w$ or less, and even more commonly of about 0.4 $ppm_w$ or less of the mercury-containing gas stream. Stated another way, the iodine concentration relative to the weight of mercury-containing, combustible (e.g., coal) feed (as fed) (whether by direct application to the combustible feed and/or injection into the mercury-containing (e.g., flue) gas) commonly is about 40 ppmw or less, more commonly about 35 ppmw or less, even more commonly about 30 ppmw or less, even more commonly is about 15 ppmw or less, even more commonly no more than about 10 ppmw, even more commonly no more than about 6 ppmw, even more commonly about 4 ppmw or less, and even more commonly no more than about 3 ppmw. Stated another way, the molar ratio, in the mercury-containing (e.g., flue) gas, of gas-phase diatomic iodine to total gas-phase mercury (both speciated and elemental) is commonly no more than about 1,200, and even more commonly no more than about 600, even more commonly no more than about 250, even more commonly no more than about 150, and even more commonly no more than about 80. By way of illustration, an effective concentration of gas-phase iodine at the air preheater outlet or particulate removal device inlet ranges from about 0.1 to about 10 ppmw, even more commonly from about 0.15 to about 5 ppmw, even more commonly from about 0.20 to about 2 ppmw, and even more commonly from about 0.25 to about 1.50 ppmw of the mercury-containing gas stream.

Commonly, the mercury-containing gas stream includes no more than about 1.0, even more commonly no more than about 0.5 and even more commonly no more than about 0.1 ppmw total bromine. The feed material generally includes no more than about 10 ppmw and even more commonly no more than about 5 ppmw natively occurring bromine.

The mercury-containing (e.g., flue) gas temperature for elemental mercury capture promoted by iodine commonly ranges from about 150 to about 600° C. and even more commonly from about 180 to about 450° C. The residence time upstream of particulate (e.g., fly ash) removal device 120 is commonly about 8 seconds, and even more commonly at least about 4 seconds, and even more commonly at least about 2 seconds.

Generally, sufficient iodine-containing additive 144 is added to produce a gas-phase iodine concentration commonly of about 3.5 ppmw or less, even more commonly of about 2 ppmw or less, even more commonly of about 1.5 ppmw or less, and even more commonly of about 0.4 ppmw or less. Stated another way, the molar ratio, in the mercury-containing (e.g., flue) gas, of gas-phase iodine to total gas-phase mercury (both speciated and elemental) is commonly no more than about 1,000, even more commonly no more than about 600, even more commonly no more than about 500, even more commonly no more than about 250, even more commonly no more than about 150, and even more commonly no more than about 80.

The Carbonaceous Material

The carbonaceous material 150 can be any porous (preferably microporous) carbonaceous iodine sorbent, including (powdered, granular, extruded, bead, impregnated, or polymer coated) activated carbon, carbon black, char, charcoal, and pet coke. The carbonaceous material 150 commonly has an iodine number ranging from about 250 to about 1,500 mg/g, more commonly from about 300 to about 1,450 mg/g, more commonly from about 350 to about 1,400 mg/g, more commonly from about 350 to about 1,350 mg/g, and even more commonly from about 500 to about 1,300 mg/g.

While the carbonaceous material 150 can (as shown by the arrows) be added at any location or multiple locations in or upstream of the particulate removal device 124 to remove mercury from the waste gas (the iodine-containing additive 144 can promote both mercury oxidation and chemisorption on the carbonaceous material 150), it is contacted with the contaminated scrubbing solution 160 in the wet scrubber 132 to control iodine levels, which can impair scrubber performance. Stated another way, the carbonaceous material can be injected in multiple locations simultaneously, for example, into the fabric filter inlet to boost oxidation and into the wastewater treatment to recover iodine.

By way of illustration, uncontrolled iodide buildup in solution can occur in a recirculating wet FGD scrubber, thereby interfering with $SO_2$ absorption. When $SO_2$ is absorbed in water the chemical reaction forms bisulfite, which is a well-known reducing agent:

$SO_2 + H_2O \rightarrow H^+ + HSO_3^-$ $SO_2$-absorption

In typical FGD scrubbers designed for gypsum production, this bisulfite ion is oxidized to sulfate by molecular oxygen.

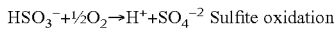
$HSO_3^- + \frac{1}{2}O_2 \rightarrow H^+ + SO_4^{-2}$ Sulfite oxidation Sulfite concentration in the scrubbing (slurry) solution controls the rate of $SO_2$ absorption. Low sulfite concentration in the scrubbing solution is one measure of high oxidation. If the oxidation rate is too low, the $SO_2$ removal efficiency can be decreased.

Iodine in the scrubbing solution is an oxidation inhibitor. High concentrations of iodide/iodine in the recirculated scrubbing solution moderate the sulfite oxidation rate and suppress the oxidation-reduction potential (ORP). Iodide is able to reduce either the sulfite or the peroxomonosulfate radicals or the catalytically active transition-metal ions and is thereby oxidized to iodine. It can subsequently be reduced to iodide again by excess sulfite. Therefore, iodine is able to inhibit the overall $SO_2$ to sulfating reaction(s) and is not consumed in the process.

Buildup of iodine and iodide in the recirculating scrubbing solution can have other effects.

Lower ORP as a result of iodide can beneficially cause speciation of selenium in scrubber solution from selenate ($SeO_4^{2-}$) to selenite ($SeO_3^{2-}$). Selenate is extremely difficult to remove prior to discharge and therefore, for some scrubbers that are limited by wastewater discharge limits for selenium, ORP reduction in a controlled manner via control of iodide concentration could be a desirable outcome.

Gas-phase mercury in coal combustion flue gases is present as either elemental)($Hg^0$), or oxidized (ionic) mercury ($Hg^{++}$). Elemental mercury is relatively insoluble in aqueous solutions, and is not removed at significant percentages in wet FGD absorbers. Oxidized mercury as mercuric chloride or mercuric bromide is very soluble and is absorbed into the FGD scrubbing slurry at high efficiency. Mercuric iodide, however is not as soluble. Oxidized mercury iodide can be lost from FGD slurry solution when utilizing iodine as a coal additive for mercury control.

The net removal of oxidized mercury across the FGD system is often limited to lower percentages by mercury "re-emission". While not wishing to be bound by any theory, a portion of the absorbed oxidized mercury can undergo chemical reduction reactions while dissolved in the aqueous phase and be converted to the relatively insoluble elemental form. Once converted, it is released from the aqueous phase back into the further treated waste gas 136.

An increase in vapor-phase iodine in the waste gas 108 upstream of a wet FGD scrubber can also lead to undesirable mercury re-emission from the wet scrubber. As noted, iodine suppresses ORP in slurry solution. Scrubber sulfite in turn is increased to compensate and $Hg^{++}$ species dissolved in solution may then be reduced to $Hg^0$ and re-emitted. Iodine is also reduced to iodide by sulfite and therefore the iodide concentration in solution will be increased.

Commonly, the carbonaceous material 150 contacted with the scrubbing solution maintains a concentration of iodide and iodine in the scrubbing solution of no more than about 1,000 mg/L, more commonly of no more than about 500 mg/L, and even more commonly of no more than about 50 mg/L. A typical concentration range of iodine and iodide in the scrubbing solution is from about 0.01 to about 50 mg/L, more typically from about 0.05 to about 25 mg/L, and even more typically from about 0.10 to about 5 mg/L. In some applications, a flow of the scrubbing solution through a fluidized or fixed packed bed of the carbonaceous material is controlled at a rate to maintain overall iodine concentration in the scrubber solution commonly at less than about 100 ppm and more commonly at less than 50 ppm.

While the iodide concentration in the recirculating scrubbing solution can be indirectly controlled through periodic scrubber blow down and waste water discharge, this is typically not effective in the absence of contacting the recirculating scrubbing solution with a carbonaceous material. As will be appreciated, "blow down" is a method of solids control. In scrubbers, solids accumulation (both dissolved and suspended solids) can interfere with the operation of the unit. Solids accumulate because of evaporative processes, and, to control the solids buildup. The solids buildup tend to be particulate when the scrubber is operating on the waste gas, and salts when the scrubber is operating on a chemical stream off gas. The salt buildup beyond a certain point can reduce the efficiency of the scrubber by approaching the solubility point of the scrubbed material in the scrubber solution. When the solubility limit is reached, the absorption stops and the scrubber efficiency can drop to almost zero. Alternatively, the scrubber may, when the solubility limit is reached, begin to deposit solids on the walls of the pipe and the like. To reduce the solids accumulation, the scrubber water rich in solids or salts is wasted or blown down and replaced with low solids water.

Blow down frequency is often adjusted to control total dissolved solids (TDS) and/or chlorides but also can incidentally reduce iodide concentration. Regular blow down schedule may be insufficient when high levels of inlet flue gas iodine are maintained over a long period of time.

The carbonaceous material 150 can remove commonly at least most, more commonly at least about 65%, more commonly at least about 75%, and even more commonly at least about 85% of the iodine and iodine-containing compounds in the scrubber solution from the treated waste stream 128. As a result of iodine removal, the further treated waste gas 136 has a low concentration of the iodine and/or iodine-containing compounds. Preferably, the concentration of the iodine and/or iodine-containing compounds in the further treated waste gas 136 is no more than about 25 ppm, more preferably no more than about 20 ppm, more preferably no more than about 15 ppm, more preferably no more than about 10 ppm, and even more preferably no more than about 5 ppm.

Total carbonaceous sorbent required for iodine removal can be relatively minimal. Powdered activated carbon was laboratory tested for iodine uptake from brine solution. In these tests, the iodine source was potassium iodide that was oxidized in solution with dilute hydrogen peroxide. Uptake of up to 100% as iodine by weight of the carbon was measured. The activated carbon tested was a microporous high capacity with an iodine number of >800 mg/g. In practice, it is expected that working capacity of about 0.5 lb/lb of carbonaceous sorbent could be achieved. As an example, for a 500 MW power plant with iodine coal additive for mercury control, about 3 to 15 lbs/hr of a highly microporous activated carbon would be sufficient to recover all of the coal additive. The annual recoverable product would be about 3 to 12 tons/year, assuming a 50% recovery.

Iodine Recovery, Regeneration, and Recycle

Returning to FIGS. 1 and 6, an optional regeneration facility 170 can recover iodine-impregnated carbonaceous material 150 from the scrubbing solution and recirculate the recovered iodine-impregnated carbonaceous material 150 as the iodine-containing additive 144. While not wishing to be bound by any theory, it is believed that mercury and other volatile metals that were present in the scrubbing solution are retained on the carbonaceous material at very low concentration compared to the mercury content of the input coal. Therefore, the carbonaceous material with sorbed iodine can be charged back to the coal belt and combusted without concern of overall mercury buildup in the combustion process. In this way, a portion of the iodine required as coal additive can be recovered directly from the process without the need for purchase of expensive and overly purified primary iodine supply. Removal of iodide from the waste water recycle, combined with the normal blow down process, will commonly keep iodide concentration in the scrubbing solution at low concentration. This in turn will increase retention of the inlet iodine (and better overall recovery of iodine) in the liquid phase by maintaining the concentration farther below a solubility limit.

The operation of the facility 170 will be discussed with reference to FIG. 6.

In step 600, the waste gas 108 is contacted with the scrubbing solution in the wet scrubber 132 to form a contaminated scrubbing solution. While the contents can vary by application and scrubbing reagent employed, the contaminated scrubbing solution will typically include, in addition to bisulfite ion, sulfite ion, sulfate ion, selenite, selenate, iodine, iodide, sulfuric acid, carbonate, and gypsum.

In step 604, the contaminated scrubbing solution is contacted with the carbonaceous material 150. Contacting may be effected by passing the contaminated scrubbing solution through a packed or fluidized bed, forming a slurry containing the carbonaceous material 150 (such as by introducing the carbonaceous material into the waste gas scrubber inlet and/or directly into the scrubbing solution), as a separate treatment step of the fine solids in the scrubber wastewater treatment stream, and as a polishing step to recover iodine from recycle water or wastewater discharge.

In optional steps 608 and 612, the contaminated scrubbing solution is contacted with an oxidizing agent, such as a hypochlorite, and/or pH-adjusted by contact with a pH adjustor to convert at least most and commonly substantially all iodide to iodine and oxidize mercury sorbed onto the carbonaceous material to a soluble form of mercury, such as $Hg^{++}$ species dissolved in solution. Iodine is sorbed more readily by the carbonaceous agent than iodide, and mercury oxidation can remove at least most and commonly substantially all of the sorbed mercury from the surface of the carbonaceous material. Commonly, the ORP of the contaminated scrubbing solution for a limestone forced oxidation scrubber employing recirculation is maintained in the range of from about 200 to about 800 mV (as measured typically platinum/gold ORP electrode) and more commonly from about 300 to about 700 mV (as measured by typically platinum/gold ORP electrode), and the pH is maintained in the range of from about pH 5 to about pH 6 and more commonly from about pH 5 to about pH 5.5.

The dissolved mercury can be precipitated by a suitable precipitant from the contaminated scrubbing solution. Suitable precipitants include sulfides, particularly organosulfides, or an amalgamating agent.

In optional step 616, the iodine-loaded carbonaceous material is recycled to the thermal unit 104 and/or introduced into the waste gas 108 to enhance elemental and speciated mercury removal.

Figure 2:
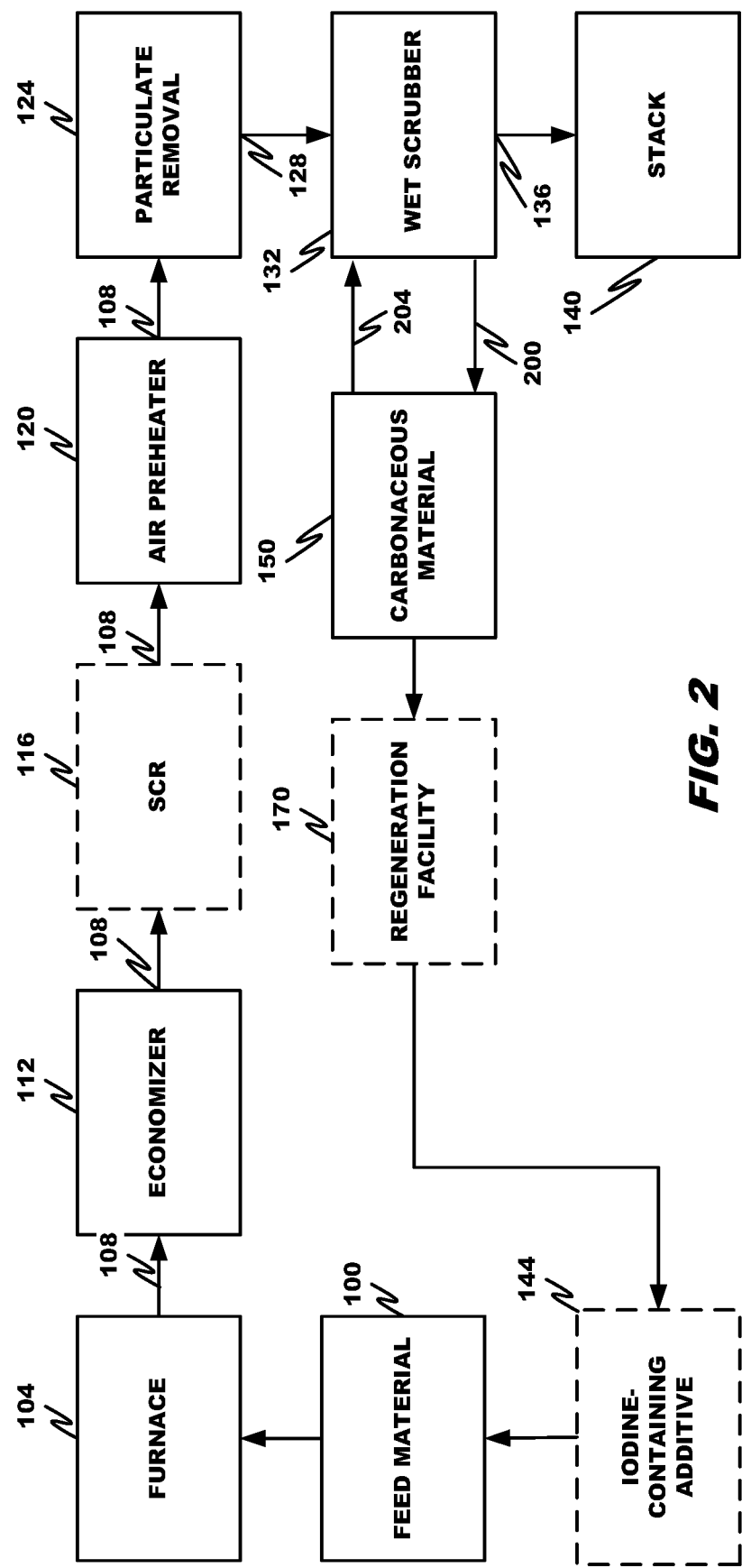
FIG. 2 is a block diagram according to an embodiment.

Referring to FIG. 2, an exemplary iodine recovery, regeneration, and recycle plant configuration is depicted. In the configuration, contaminated scrubbing solution 200 is removed from the wet scrubber 132, passed through a fixed or fluidized bed of carbonaceous material 150 and the treated scrubbing solution 204 returned to the scrubber 132.

Figure 5:
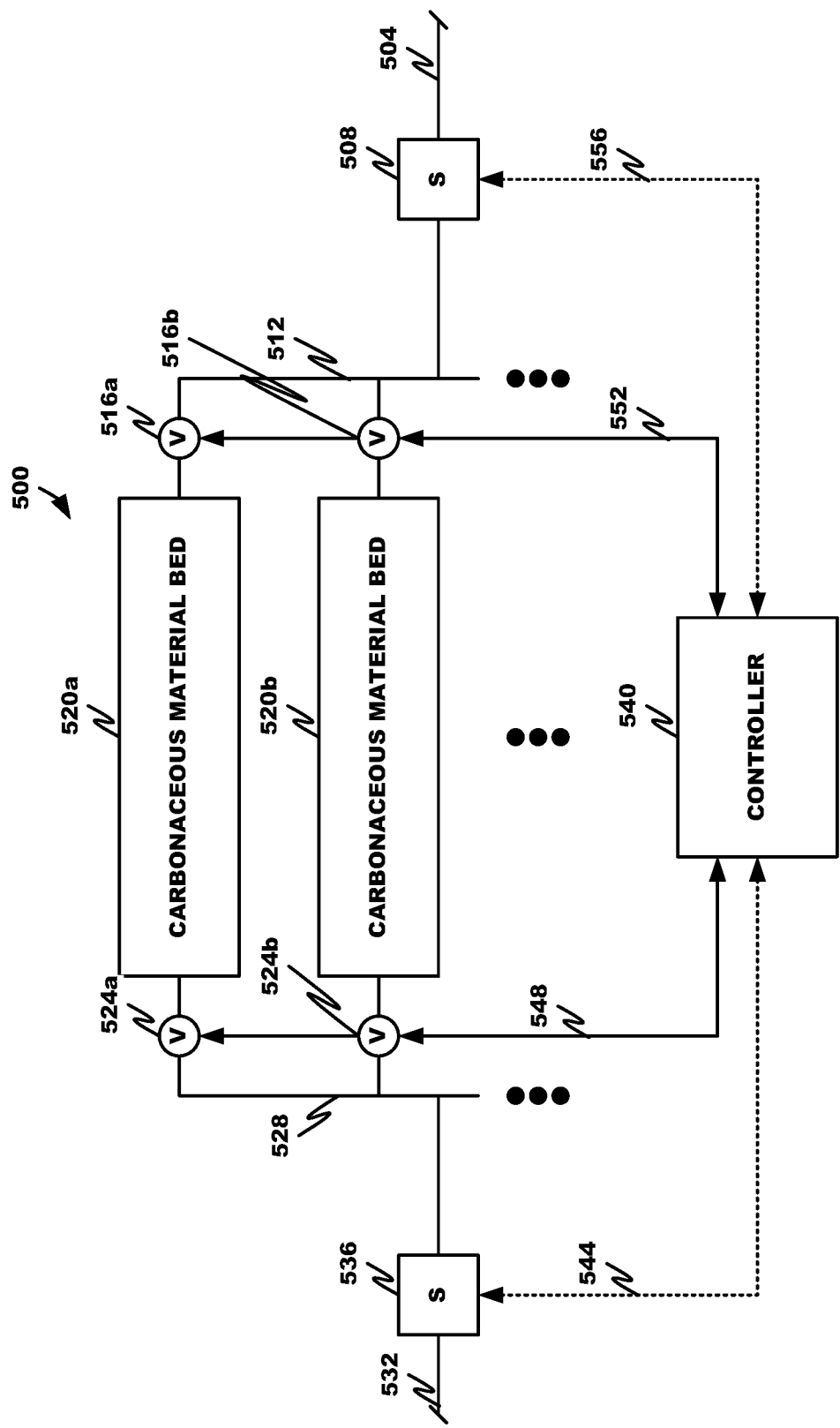
FIG. 5 is a block diagram according to an embodiment.

FIG. 5 depicts a regeneration facility 170 that may be employed in the plant configuration of FIG. 2.

The facility 500 includes an input conduit 504 to carry contaminated scrubbing solution, an input sensor 508 (such as a spectrophotometer) to sense the concentration of iodine and/or iodide in the contaminated scrubbing solution, an input manifold 512 and plural controllable input valves 516a, b, . . . to direct the contaminated scrubbing solution to an appropriate bed of carbonaceous material in a selected vessel 520a, b, . . . , plural controllable output valves 524a, b, . . . to prevent backflow of treated contaminated scrubbing solution to other non-selected beds, an output manifold 528, an output conduit 532 to carry the treated contaminated scrubbing solution back to the scrubber, and an output sensor 536 (such as a spectrophotometer) to sense the concentration of iodine and/or iodide in the treated contaminated scrubbing solution.

The facility further includes a controller 540 in communication, via control lines 544, 548, 552, and 556, with the input and output sensors 508 and 536 and input and output valves 516a, b, . . . and 524 a, b, . . . . The controller 540 comprises a computer readable medium (not shown) and microcontroller (not shown) to sense an input iodine and/or iodide concentration in the contaminated scrubbing solution and output iodine and/or iodide concentration in the treated contaminated scrubbing solution, compare the input and output concentrations, when the output concentration and/or the difference between the input and output concentrations is at least a specified threshold, determine that the currently selected bed of carbonaceous material requires regeneration or replacement, and in response, close the input and output valves to the vessel containing the bed, and open the input and output valves to the vessel containing a next selected bed.

The carbonaceous material from the spent bed can be regenerated and/or recycled as the iodine-containing additive 144. Regeneration could include steps 608 and 612 to remove sorbed mercury followed by a suitable process to desorb iodine and iodide from the carbonaceous material. For example, iodine is soluble in, and desorbed from the carbonaceous material in, a number of organic solvents. In another example, the carbonaceous material can be acidified with a mineral acid to a pH in the range of about pH 1 to about pH 4 to dissolve the iodine in solution. In another example, the carbonaceous material can be reduced by a reducing agent to iodide, which has less affinity for the carbonaceous material. Under proper conditions of pH, the iodide will desorb into solution. Another technique is by elution from the carbonaceous material using aqueous sodium hydroxide. In another technique, the iodine is eluted by contacting the carbonaceous material with aqueous sodium chloride (NaCl) and bleach (NaOCl) under slightly acidic pH. Once dissolved, the iodine can be isolated by known techniques, such as precipitation, an ion exchange resin, and the like.

Figure 3:
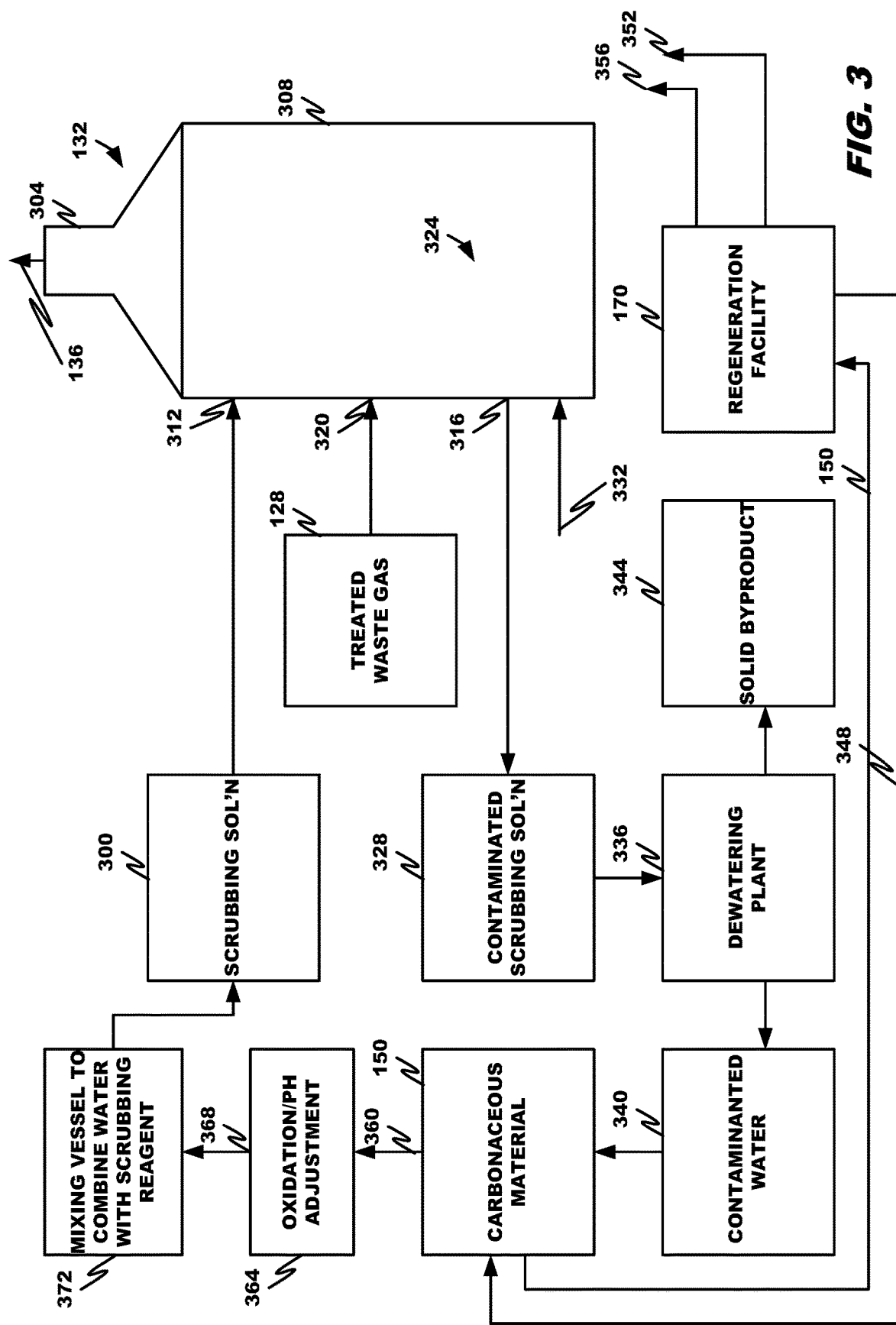
FIG. 3 is a block diagram according to an embodiment.

FIG. 3 depicts a scrubbing facility that may be employed in the plant configuration of FIG. 1. The wet scrubber 132 includes a further treated waste gas 136 outlet 304, a scrubber housing 308, a scrubbing solution 300 inlet 312 (which is typically a series of spray nozzles to provide an atomized spray of scrubbing solution 300), and a scrubbing solution 300 outlet 316, and treated waste gas 128 inlet 320. The scrubber can include one or more scrubbing vanes (not shown) to induce turbulent gas flow within the scrubber housing 308. The contaminated scrubbing solution 328 settles in a lower portion 324 of the scrubber 132 for removal by the scrubbing slurry outlet 316. An oxidizing agent 332 can be introduced to perform forced oxidation as discussed above.

The contaminated scrubbing solution 328 is removed from the scrubber 132 and sent to a dewatering plant 336. A typical dewatering plant includes one or more of hydrocyclones, filters, settling tanks, and the like, to dewater the solid byproduct in the contaminated scrubbing solution 328. The solid byproduct can, for instance, be a carbonate, hydroxide, sulfate (e.g., gypsum), sulfite, fly ash, and other recovered waste gas constituents.

The dewatering plant 332 produces contaminated water 340 and a solid byproduct 344.

The contaminated water 340 is contacted with the carbonaceous material 150, such as by passing the water 340 through a fixed or fluidized bed of carbonaceous material 150. When the carbonaceous material 150 is loaded with iodine and/or iodide, it can be provided to the regeneration facility 170 to produce clean carbonaceous material 348 substantially free of elemental and speciated mercury and iodine, a mercury byproduct 352, and an iodine-containing product 356. Alternatively, after mercury removal the carbonaceous material 150 can be used as an iodine-containing additive 144.

The treated water 360 is subjected to oxidation and/or pH adjustment (box 364) to precipitate waste gas contaminants (which are then removed by a liquid/solid separation process (not shown), and the purified water 368 combined, in a mixing vessel 372, with fresh water and additional scrubbing reagent, to provide recirculated scrubbing solution 300.

Figure 4:
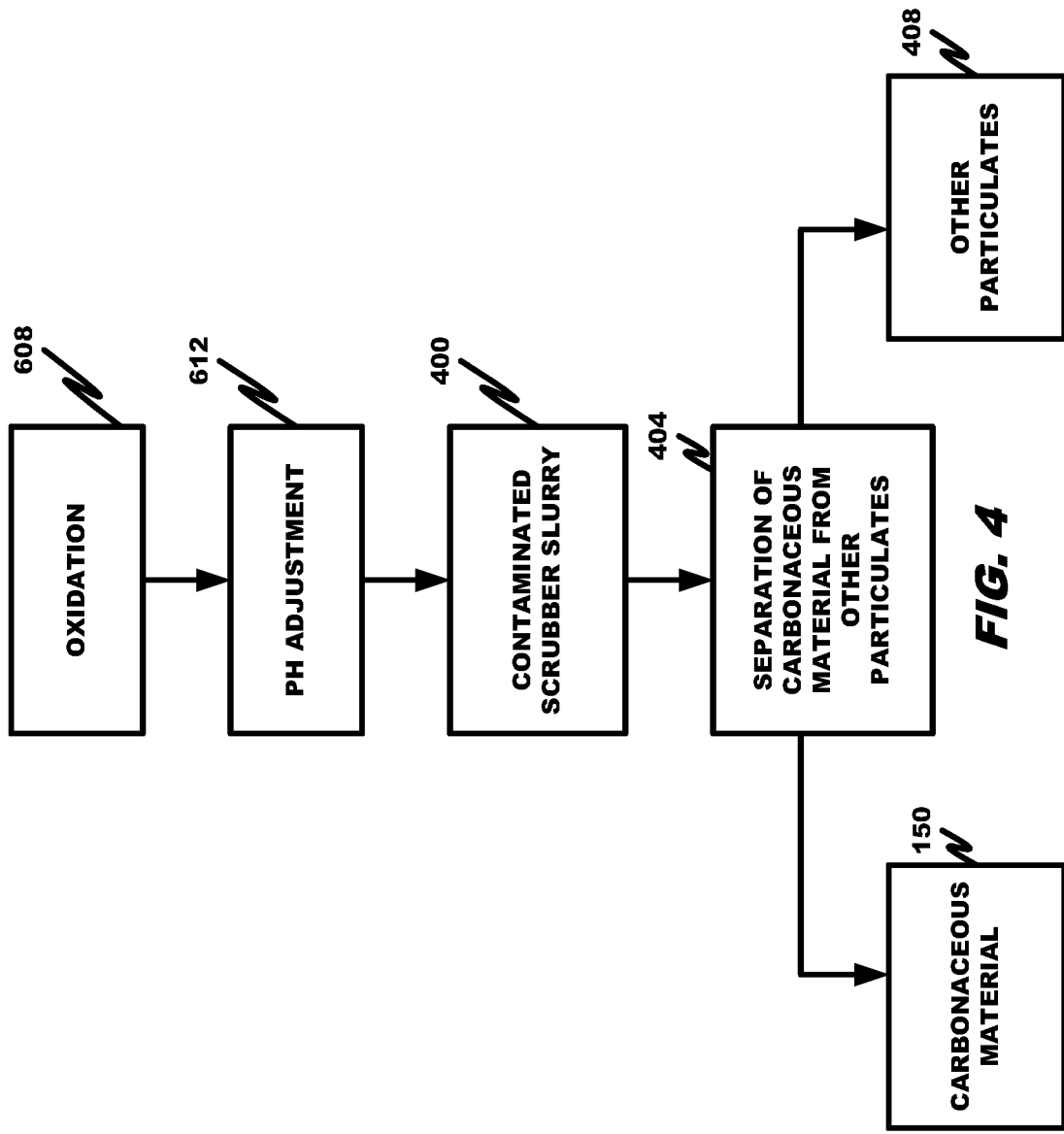
FIG. 4 is a block diagram according to an embodiment.

FIG. 4 depicts a process for recovering carbonaceous material introduced upstream of or into the treated gas inlet of the scrubber. In that event, the carbonaceous material and scrubbing solution form a slurry or the carbonaceous material becomes part of a slurried scrubbing solution, particularly an FGD scrubber producing a gypsum byproduct. Following oxidation (step 608) and pH adjustment (step 612), the resulting contaminated scrubber slurry 400 is subjected to separation of the carbonaceous material from the other particulates (such as gypsum and/or flyash) to form a recovered carbonaceous material 150 and other particulates 408. The separation may be based on the differing properties of the carbonaceous material 150 and other particulates 408. The properties include particle size, density, weight, specific gravity, and the like. For example, filtration may be used to effect the separation where the carbonaceous material 150 and other particulates 408 have different particles sizes and size fractions. Hydrocyclones may be used to effect separation where the carbonaceous material 150 and other particulates 408 have different weights, specific gravities, and/or densities. Gravity settling and/or flotation may be used where the carbonaceous material 150 and other particulates 408 have different hydrophilicities and/or hydrophobicities.

In one configuration, the solid fines containing suspended carbonaceous material are separated from the coarse gypsum solids using a hydroclone. The hydroclone overflow stream with the fines in liquid suspension is next treated by contact with an oxidizing agent, such as sodium hypochlorite, to remove collected mercury from the activated carbon. At this step, the mercury is redissolved into solution and the activated carbon is substantially mercury-free. The mercury is precipitated from solution by contact with organosulfides.

The hydroclone overflow stream can be treated with oxidizer and pH adjusted, as necessary, to oxidize iodide to iodine. Iodine is then efficiently adsorbed on the suspended carbonaceous material, leaving a very low concentration in solution. The carbonaceous material is then separated from solution by filtration and dewatered.

Another process configuration is introduction of carbonaceous sorbent expressly for iodine recovery into the hydroclone overflow stream in combination with an oxidizer or oxidizing agent.

Other iodide/iodine recovery methods are possible. In one configuration, the recycle wastewater and/or discharge wastewater are passed through a final polishing treatment wherein an oxidizer such as hydrogen peroxide, potassium permanganate, chlorine or sodium hypochlorite is added and the treated stream is then passed through a packed granular activated carbon bed. This step would follow any treatment for removal of metals such as mercury or selenium. The packed bed is then changed when fully loaded, the carbon can be dried and then recharged to the coal belt. Alternatively, iodine could be recovered from a carbonaceous sorbent or granular bed by further treatment steps to a purified commercial product if there was sufficient demand and it was cost effective to do so.

Another method that can be used for direct iodide removal from aqueous solution is the use of ion (anion) exchange, typically with proprietary organic ion exchange resins. Anion exchange would typically be utilized after separation of coarse solids from the slurry treatment loop. The iodine and/or iodine-containing compounds removed by ion exchange can be stripped from the ion exchange medium by a stripping solution.

Dissolved iodine and/or iodine-containing compounds can be removed from the scrubbing solution by other techniques, including solvent extraction, adsorption, absorption, precipitation, membrane filtration, and the like. In one configuration, the dissolved iodine and/or iodine-containing compounds are removed in an organic solvent, such as a hydrocarbon solvent. Removal is effected based on the relative solubilities of the iodine and/or iodine-containing compounds in two different immiscible liquids, namely the aqueous phase of the scrubbing solution and an organic solvent. In other words, the iodine and/or iodine-containing compounds are extracted from one liquid phase into another liquid phase. Extraction can be done without chemical change, by a solvation mechanism, by an ion exchange mechanism, by ion pair extraction, or by aqueous two-phase extraction.

Other dissolved impurities, such as sulfur oxides, nitrogen oxides, and the like, can be removed before recycle. Selective removal of the various species can be, for example, by membrane separation, precipitation, adsorption, and/or absorption.

Upstream Oxidation of Mercury Species

Gaseous oxidized mercury compounds are much more soluble in water than elemental mercury. Mercury entering a wet FGD scrubber should ideally be fully or substantially fully oxidized to maximize capture of mercury in the scrubber. Halogen additives increase mercury oxidation and also retention on fly ash and Loss on Ignition ("LOI") carbon particulate surfaces upstream of the scrubber. With reference to FIGS. 1 and 2, if a fabric filter baghouse is installed, as the particulate removal device 124, wet upstream of the scrubber 132, mercury oxidation can be increased during flue gas passage through the fabric filter and ash cake. Carbonaceous sorbents injected into and/or upstream of the baghouse can further increase mercury oxidation. Typically, the total mercury is removed to a high percentage across the fabric filter, and the vapor mercury exits the baghouse as $Hg^{++}$.

High sulfur dioxide and $SO_3$ or other acid flue gas species such as $NO_2$ inhibit mercury capture on fly ash or carbonaceous sorbents in the baghouse, but do not inhibit mercury oxidation. An increase in mercury oxidation is still beneficial for downstream mercury capture in the scrubber. Mercury oxidation across a fabric filter can be enhanced by selection of bag fabric, temperature and ash cake management, sorbent injection, oxidation catalyst or halogen coal additive. This can allow the treatment rate of initial halogen coal additive to be reduced or even eliminated when the final mercury control device is a wet scrubber.

EXPERIMENTAL

The following examples are provided to illustrate certain aspects, embodiments, and configurations of the disclosure and are not to be construed as limitations on the disclosure, as set forth in the appended claims. All parts and percentages are by weight unless otherwise specified.

Short-term tests of liquid iodide salt solution added to the coal for mercury reduction have been conducted on a full-scale boiler firing a PRB/bituminous blend coal and equipped with a LSFO scrubber. An increase in mercury re-emission was evidenced when the coal additive was applied. This test confirms the short-term impact of iodide increase in the FGD. Over time, it is expected that this could be prevented by extraction of iodide from slurry solution.

Powdered activated carbon has been tested in the laboratory for iodine uptake from brine solution. In these tests, the iodine source was potassium iodide that was oxidized by dilute hydrogen peroxide. Uptake of up to 100% as iodine by weight of the carbon was measured.

Scrubber ORP was monitored over a period of a month at a Midwestern power plant firing a PRB coal and employing a limestone forced oxidation scrubber for sulfur control. Iodine was added onto the coal at low ppm level as a mercury control agent over the entire monitored period. Iodine in solution (as iodide) increased from 0 to about 46 ppm over about 24 days. Iodine in the slurry solids, measured after separation from the slurry liquid, increased from about 20 ppm to 645 ppm after 15 days. This indicates that the majority of iodine is partitioning to the solids as insoluble iodine. However, no attempt was made during this test to separate iodine from the scrubber liquor. The use of carbon sorbents or other separation technologies, as described herein, could have allowed the iodine as I2 to separate onto the carbon sorbent preferentially to the gypsum solids. Separation would have reduced the total iodine concentration in solution over time, since iodide species are both oxidized in the scrubber absorber as well as reduced back to iodide.

A number of variations and modifications of the disclosure can be used. It would be possible to provide for some features of the disclosure without providing others.

For example in one alternative embodiment, the present disclosure is not limited to a recirculating scrubber. It may be applied to other types of non-recirculating scrubbers.

In another alternative embodiment, the present disclosure is employed with any of a number of types of wet scrubbers. To promote maximum gas-liquid surface area and residence time, a number of wet scrubber designs have been used, including spray towers, venturis, plate towers, and mobile packed beds. The configuration of the tower may be vertical or horizontal, and flue gas can flow cocurrently, countercurrently, or crosscurrently with respect to the liquid. A venturi scrubber is a converging/diverging section of duct. The converging section accelerates the gas stream to high velocity. When the liquid stream is injected at the throat, which is the point of maximum velocity, the turbulence caused by the high gas velocity atomizes the liquid into small droplets, which creates the surface area necessary for mass transfer to take place. The higher the pressure drop in the venturi, the smaller the droplets and the higher the surface area. A packed scrubber includes a tower with packing material inside. This packing material can be in the shape of saddles, rings, or some highly specialized shapes designed to maximize contact area between the dirty gas and liquid. A spray tower includes a tower with spray nozzles, which generate the droplets for surface contact. Spray towers are typically used when circulating a slurry (see below). The high speed of a venturi would cause erosion problems, while a packed tower would plug up if it tried to circulate a slurry.

Figure 6:
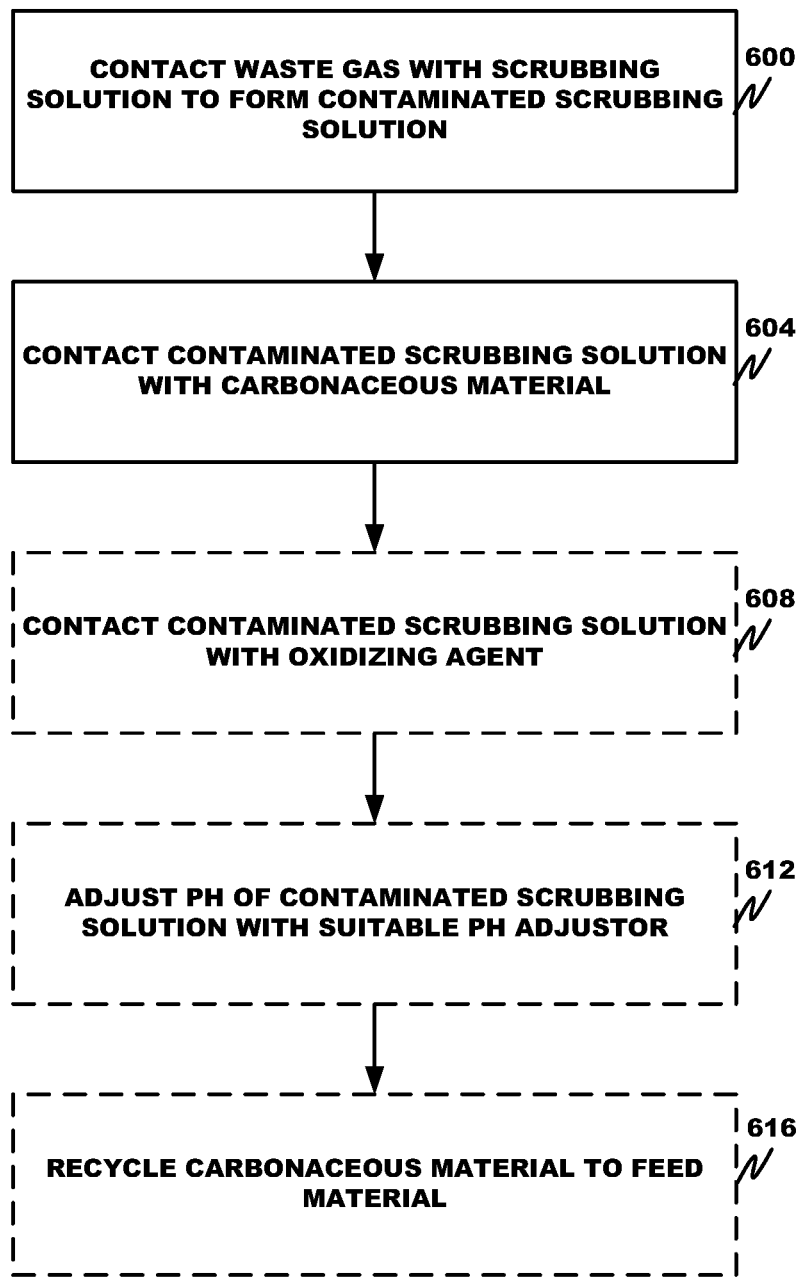
FIG. 6 is a block diagram according to an embodiment.

In yet other embodiments, the sequence of the process steps in any of FIGS. 4 and 6 can be reversed and/or the steps can be combined, depending on the application.

In yet other embodiments, mercury is oxidized by introducing, on the feed material and/or in the waste gas, a halogen and/or halogen-containing material in lieu of or addition to iodine and/or iodine-containing material. The halogen and/or halogen-containing material can be, for example, bromine, chlorine, bromide, chloride, and other bromine- and/or chlorine-containing compounds or compositions.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method, comprising:
contacting, upstream of a wet scrubber, a halogen-containing additive with a waste gas comprising an acid gas and elemental mercury to oxidize the elemental mercury in the waste gas and form a treated gas stream comprising a non-elemental mercury and the halogen-containing additive;
passing the treated gas stream through the wet scrubber to remove the halogen-containing additive from the waste gas and form a scrubbing solution comprising the halogen-containing additive; and
sorbing at least a portion of the halogen-containing additive on a carbonaceous material.

2. The method of claim 1, further comprising:
contacting the halogen-containing additive with a mercury-containing feed material, wherein the waste gas is derived from the mercury-containing feed material.

3. The method of claim 1, further comprising:
recovering the carbonaceous material comprising the sorbed at least a portion of the halogen-containing additive from the scrubbing solution; and
introducing the recovered the carbonaceous material comprising the sorbed at least a portion of the halogen-containing additive to the waste gas as the halogen-containing additive.

4. The method of claim 1, further comprising:
separating the sorbed at least a portion of the halogen-containing additive from the carbonaceous material; and
introducing the separated at least a portion of the halogen-containing additive to the waste gas as the halogen-containing additive.

5. The method of claim 1, recovering the carbonaceous material comprising the sorbed at least a portion of the halogen-containing additive from the scrubbing solution; and
returning the scrubbing solution to the wet scrubber and wherein the wet scrubber is a flue-gas desulfurization scrubber.

6. The method of claim 1, wherein a flow of an input scrubbing solution through a first bed of carbonaceous material is stopped when a concentration of the halogen-containing additive in an output scrubbing solution is at least a predetermined threshold and/or a difference between concentrations of the halogen-containing additive in the input and output scrubbing solutions is at least a predetermined threshold.

7. The method of claim 6, wherein the flow through the input scrubbing solution through the first bed of carbonaceous material is stopped automatically by a microprocessor and a flow of the output scrubbing solution through a second bed of carbonaceous material is initiated automatically by the microprocessor in response to an absolute value of the concentration of the halogen-containing additive in the output scrubbing solution reaching the at least a predetermined threshold.

8. The method of claim 1, wherein the carbonaceous material is activated carbon and wherein the carbonaceous material is introduced into a reservoir of the wet scrubber.

9. The method of claim 1, wherein the carbonaceous material is activated carbon and wherein the carbonaceous material is introduced upstream of the wet scrubber.

10. The method of claim 1, further comprising contacting the scrubbing solution with one or more of an oxidizing agent and a pH-adjustor.

11. A method, comprising:
contacting, upstream of a wet scrubber, a halogen-containing additive with a waste gas comprising an acid gas and elemental mercury to form a treated gas stream comprising the acid gas, a non-elemental mercury oxidized from the elemental mercury, and at least one of an elemental halogen and a halogen-containing composition;

passing the treated gas stream through the wet scrubber to remove the at least one of the elemental halogen and the halogen-containing composition from the waste gas and form a scrubbing solution comprising the at least one of the elemental halogen and the halogen-containing composition;

sorbing at least a portion of the at least one of the elemental halogen and the halogen-containing composition on a carbonaceous material; and recovering the carbonaceous material comprising the sorbed at least a portion of the at least one of the elemental halogen and the halogen-containing composition from the scrubbing solution wherein the recovered carbonaceous material is one or more of:

(i) introduced to the waste gas as the halogen-containing additive; and (ii) charged to coal and, thereafter, combusted with the coal to form the waste gas.

12. The method of claim 11, further comprising:
contacting the halogen-containing additive with a mercury-containing feed material, wherein the waste gas is derived from the mercury-containing feed material.

13. The method of claim 11, wherein after the recovering, the scrubbing solution is returned to the wet scrubber and wherein the wet scrubber is a flue-gas desulfurization scrubber.

14. The method of claim 11, wherein a flow of an input scrubbing solution through a first bed of carbonaceous material is stopped when a concentration of the at least one of the elemental halogen and the halogen-containing composition in an output scrubbing solution is at least a predetermined threshold and/or a difference between concentrations of the at least one of the elemental halogen and the halogen-containing composition in the input and output scrubbing solutions is at least a predetermined threshold.

15. The method of claim 14, wherein the flow through the input scrubbing solution through the first bed of carbonaceous material is stopped automatically by a microprocessor and a flow of the output scrubbing solution through a second bed of carbonaceous material is initiated automatically by the microprocessor in response to an absolute value of the concentration of the at least one of the elemental halogen and the halogen-containing composition in the output scrubbing solution reaching the at least a predetermined threshold.

16. A method, comprising:
receiving a waste gas comprising an acid gas and at least one of an elemental halogen and a halogen-containing composition;

passing the waste gas through a wet scrubber to remove the at least one of the elemental halogen and the halogen-containing composition from the waste gas and form a scrubbing solution comprising the at least one of the elemental halogen and the halogen-containing composition;

sorbing at least a portion of the at least one of the elemental halogen and the halogen-containing composition on a carbonaceous material; and recovering the carbonaceous material from the scrubbing solution to form a recovered carbonaceous material.

17. The method of claim 16, wherein the waste gas comprises elemental mercury and further comprising:
contacting a halogen-containing additive with the waste gas upstream of the wet scrubber to oxidize the elemental mercury in the waste gas to a non-elemental mercury, wherein at least a portion of the removed at least one of the elemental halogen and the halogen-containing composition is contacted with the waste gas upstream of the wet scrubber.

18. The method of claim 17, further comprising:
introducing the recovered the carbonaceous material to the waste gas as the halogen-containing additive.

19. The method of claim 16, wherein after the recovering, the scrubbing solution is returned to the wet scrubber and wherein the wet scrubber is a flue-gas desulfurization scrubber.

20. The method of claim 16, wherein a flow of an input scrubbing solution through the wet scrubber is stopped automatically by a microprocessor when a concentration of the at least one of the elemental halogen and the halogen-containing composition in an output scrubbing solution is at least a predetermined threshold and/or a difference between concentrations of the at least one of the elemental halogen and the halogen-containing composition in the input and output scrubbing solutions is at least a predetermined threshold.

* * * * *